US008488145B2

(12) United States Patent
Sato

(10) Patent No.: US 8,488,145 B2
(45) Date of Patent: Jul. 16, 2013

(54) RETRIEVING UPDATED INFORMATION FROM A SERVER BASED ON AN UPDATE FILE IN RSS OR ATOM FORMAT

(75) Inventor: Tomoya Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1044 days.

(21) Appl. No.: 11/565,932

(22) Filed: Dec. 1, 2006

(65) Prior Publication Data

US 2007/0139698 A1  Jun. 21, 2007

(30) Foreign Application Priority Data

Dec. 2, 2005  (JP) ................. 2005-349449

(51) Int. Cl.
*G06F 3/12* (2006.01)
*G06K 15/00* (2006.01)

(52) U.S. Cl.
USPC ........................................ 358/1.15; 358/1.14

(58) Field of Classification Search
USPC .............................................. 358/1.15, 1.14
See application file for complete search history.

(56) References Cited

U.S. PATENT DOCUMENTS

| 6,876,461 B2* | 4/2005 | Usami ........................ 358/1.15 |
| 7,181,448 B2* | 2/2007 | Silverbrook et al. ......... 707/770 |
| 2003/0137691 A1* | 7/2003 | Tanaka ....................... 358/1.15 |
| 2006/0256366 A1* | 11/2006 | Ferlitsch ..................... 358/1.15 |

FOREIGN PATENT DOCUMENTS

| JP | 08-171630 | * 7/1996 |
| JP | 11-134126 | 5/1999 |
| JP | 11-194984 | 7/1999 |
| JP | 2000-66945 | 3/2000 |
| JP | 2002-149478 | 5/2002 |
| JP | 2004-178072 | 6/2004 |
| JP | 2004-351806 | 12/2004 |
| JP | 2005-198139 | 7/2005 |
| JP | 2005-267526 | 9/2005 |
| JP | 2005-284334 | 10/2005 |
| WO | 2005/065237 | 7/2005 |

OTHER PUBLICATIONS

Machine translation of JP11-194984 to Neigishi.*
D. Brickly, et al., "RDF Site Summary (RSS) 1.0". Online May 30, 2001, RSS-DEV Working Group, retrieved on Mar. 17, 2005, Internet <URL:http://purl.org/rss/1.0/spec>.
M. Nottingham, et al., "The Atom Syndication Format draft-ietf-atompub-format-03". Online Oct. 20, 2004, RSS-DEV Working Group, retrieved Sep. 19, 2007, Internet. <URL:http://atompub.org/2004//10/20/draft-ietf-atompub-foramat-03.html>.

* cited by examiner

*Primary Examiner* — Eric A Rust
(74) *Attorney, Agent, or Firm* — Fitzpatrick, Cella, Harper & Scinto

(57) ABSTRACT

The invention makes it possible to reduce wasteful use of recording paper and other resources by readily and reliably being able to judge updated content of a website and printing out if content has been updated. An apparatus of the invention judges whether there are any print jobs to be printed at the current time when scheduled print job processing is started. If a print job to be printed exists, the apparatus requests a website for update information written in RSS or Atom format according to the URL specified by the print job, acquires the requested update information, then determines whether a resource of the registered URL has been updated by analyzing the acquired information. If the resource of the registered URL has been updated, the apparatus acquires the resource using the URL, then generates a print image based on the acquired resource, and prints the print image.

8 Claims, 22 Drawing Sheets

FIG. 13

| 1301 | HISTORY | ▶ |
|---|---|---|
| 1302 | ADD TO PAGE MEMORY | ▶ |
| 1303 | PAGE MEMORY LIST | ▶ |
| 1304 | TEXT SIZE | ▶ |
| 1305 | ENCODING | ▶ |
| 1306 | ZOOM | ▶ |
| 1307 | SPECIFICATION SETTINGS | ▶ |

FIG. 15

```xml
<?xml version="1.0" encoding="utf-8"?>
```
1401 — `<rdf.RDF`
  `xmlns:rdf="http://www.w3.org/1999/02/22-rdf-syntax-ns#"`
  `xmlns:dc="http://purl.org/dc/elements/1.1/"`
  `xmlns:sy="http://purl.org/rss/1.0/modules/syndication/"`
  `xmlns:admin="http://webns.net/mvcb/"`
  `xmlns="http://purl.org/rss/1.0/">`

1402 — `<channel rdf.about="http://example_news.example.com/">`
1407 — `<title>example_news</title>`
1408 — `<link>http://example_news.example.com/</link>`
1409 — `<description>XXX NEWSPAPER</description>`
  `<dc:language>ja</dc:language>`
  `<dc:creator></dc:creator>`
  `<dc:date>2005-06-19T23:46:36+09:00</dc:date>`

1411 — `<items>`
1412 — `<rdf:Seq>`
1413 — `<rdf:li rdf:resource="http://example_news.example.com/national/update/0615/TKY200506150172html?ref=rss"/>`
1413 — `<rdf:li rdf:resource="http://example_news.example.com/national/update/0615/OSK200506150031html?ref=rss"/>`
1413 — `<rdf:li rdf:resource="http://example_news.example.com/sports/update/0615/064.html?ref=rss""/>`
  `<!-- rdf.li ELEMENT REPETITION... -->`
  `</rdf.Seq>`
  `</items>`

`</channel>`

1404 — `<item rdf:about="http://example_news.example.com/national/update/0615/TKY200506150172html?ref=rss">`
1417 — `<title>PLANE GROUNDED AT HANEDA</title>`
1418 — `<link>http://example_news.example.com/national/update/0615/TKY200506150172html?ref=rss</link>`
1419 — `<description>`
  FLIGHT XX SUFFERED A MECHANICAL PROBLEM AFTER LANDING AT HANEDA AIRPORT AROUND 10 AM, JUNE 15···
  `</description>`
  `<dc:subject>SOCIETY</dc:subject>`
  `<dc:date>2005-06-15T13:33:36+09:00</dc:date>`
  `</item>`

1404 — `<item rdf:about="http://example_news.example.com/national/update/0615/OSK200506150031.html?ref=rss">`
1417 — `<title>PASSERBY INJURED BY METAL SHARD IN GUARDRAIL</title>`
1418 — `<link>http://example_news.example.com/national/update/0615/OSK200506150031.html?ref=rss</link>`
1419 — `<description>`
  A MALE COMPANY EMPLOYEE (YY) WAS INJURED AFTER COMING INTO CONTACT WITH A METAL SHARD WEDGED IN THE SEAM OF A GUARDRAIL WHILE WALKING ON A PREFECTURAL ROAD IN XX, KYOTO PREFECTURE, ABOUT 11:40 PM, JUNE 14.···
  `</description>`
  `<dc:subject>SOCIETY</dc:subject>`
  `<dc:date>2005-06-15T12:31:18+09:00</dc:date>`
  `</item>`

1404 — `<item rdf:about="http://example_news.example.com/sports/update/0615/064.html?ref=rss">`
1417 — `<title>1000TH HIT AGAINST THE PHILLIES</title>`
1418 — `<link>http://example_news.example.com/sports/update/0615/064.html?ref=rss</link>`
1419 — `<description>`
  XXX NOTCHED UP 1,000 HITS IN THE GAME PLAYED ON JUNE 15 (JUNE 16 JAPAN TIME)
  `</description>`
  `<dc:subject>SPORTS</dc:subject>`
  `<dc:date>2005-06-15T13:18:58+09:00</dc:date>`
  `</item>`
  `<item rdf:about="http://my-mfp.example.com/archives/2004/12/22/0123400.html">`
  `<!--...-->`
  `</item>`

`<!--item ELEMENT REPETITION-->`

`</rdf.RDF>`

RETRIEVING UPDATED INFORMATION FROM A SERVER BASED ON AN UPDATE FILE IN RSS OR ATOM FORMAT

BACKGROUND OF THE INVENTION

1. Field of the Invention

The present invention relates to a technique for receiving and printing resources on a website stored on a Web server.

2. Description of the Related Art

These days, many information devices are connected to a network and various applications are performed. The popularization of the World Wide Web (WWW) in particular has been remarkable. Web servers on the Internet or an intranet provide various information, the content of which is updated daily. Users generally browse information by operating software (Web browsers) for accessing these Web servers using HTTP (Hypertext Transfer Protocol) on a PC or the like. Further, information browsed with a Web browser is often sent to a printer and printed out on paper for reading.

However, performing operations of launching a Web browser, acquiring information and instructing a printer to print is troublesome. To solve this problem, configurations have been proposed in which the printer itself is connected to the network, and Web pages specified in advance are periodically acquired and printed out. Many of these are also designed to prevent the same document being printed repeatedly.

As an example of resolving the above mentioned problem, a known document output apparatus checks the update date and time of a specified Web page and prints the Web page if the Web page has been updated since it was last printed (e.g., Japanese Patent Application Laid-Open No. 11-194984).

On the other hand, an increasing number of sites syndicate (distribute) update information and the like of the site using data in an XML format such as ATOM or a version of RSS. RSS is disclosed in the "RDF Site Summary (RSS) 1.0" by Dan Brickley and ten other authors, [online] May 30, 2001, RSS-DEV Working Group. Atom is disclosed in "The Atom Syndication Format draft-ietf-atompub-froamat-03" edited by M. Nottingham, R. Sayre, [online] Oct. 20, 2004, RSS-DEV Working Group.

With conventional proposals such as the one shown in Japanese Patent Application Laid-Open No. 11-194984, printing is performed after judging whether or not a specified page has been updated. Consequently, application is difficult in sites where new information is sequentially added as separate files. With many news sites, for example, separate files are added with a different URL for each article, making it impossible to periodically output update information for these sites.

SUMMARY OF THE INVENTION

An object of the present invention, which was made in view of the above problem, is to provide a technique for reducing wasteful use of recording paper and other resources by readily and reliably being able to judge updated content of a website and printing out if content has been updated.

To solve the above problem, an image processing apparatus of the present invention is, for example, provided with the following configuration. That is, an image processing apparatus that includes a network interface and a printing unit, and receives and prints resource data stored on a Web server, is provided with a registering unit adapted to register URL information of a Web server, an acquisition unit adapted to acquire update information in a preset format stored on the Web server whose URL information was registered, by requesting the update information at a preset time interval, a judging unit adapted to judge whether or not a resource of the Web server has been updated since a previous access by analyzing the update information acquired by the acquisition unit, and a print control unit adapted to receive the resource of the Web server by requesting the resource if judged by the judging unit to have been updated, transform the received resource into printable image data, and print the image data with the printing unit.

According to the present invention, reducing wasteful use of recording paper and other resources is made possible by readily and reliably being able to judge updated content of a website and printing out if content has been updated.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 shows an exemplary screen displayed when a Menu button is selected on the screen shown in FIG. 9.

FIG. 15 shows an exemplary update information file.

DESCRIPTION OF THE EMBODIMENTS

Embodiments according to the present invention are described in detail below in accordance with the accompanying drawings.

System Configuration

Figure 1:
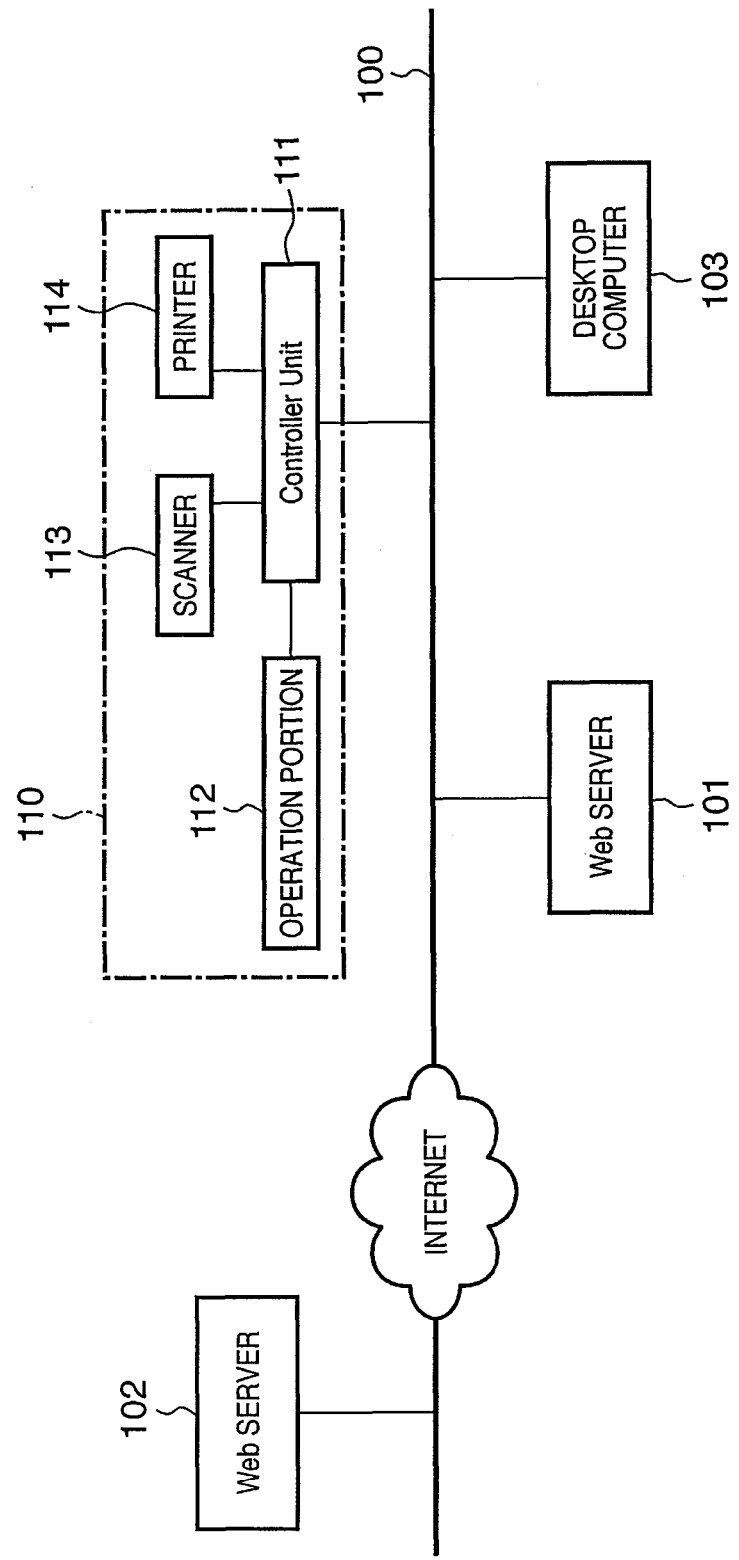
FIG. 1 is a block diagram showing the overall configuration of an image processing system according to an embodiment.

FIG. 1 is a block diagram showing the overall configuration of an image processing system according to an embodiment of the present invention. In FIG. 1, the image processing system is configured from an image processing apparatus 110, Web servers 101 and 102, and a desktop computer 103 connected to each other via a network 100.

The image processing apparatus 110 is provided with a scanner 113, which is an image input device, a printer 114, which is an image output device, a controller unit 111, and an operation portion 112, which is a user interface.

The scanner 113, the printer 114 and the operation portion 112 are respectively connected to the controller unit 111 and controlled by commands from the controller unit 111. The controller unit 111 is connected to the network 100, and communicates with the Web servers 101 and 102 and the desktop computer 103.

The Web servers 101 and 102 return various resources in response to requests from the image processing apparatus 110. In the example shown in the present embodiment, the Web server 101 is connected to the same network as the image processing apparatus 110, while the Web server 102 is connected via the Internet.

The desktop computer 103 is the information processing apparatus (personal computer, etc.) normally used by the user, and stores application programs used by the user, user data, and the like. The desktop computer 103 interacts with the image processing apparatus 110 and the Web servers 101 and 102, etc. via a LAN 100, and is also able to execute distributed applications.

Software Configuration of Image Processing Apparatus

Figure 2:
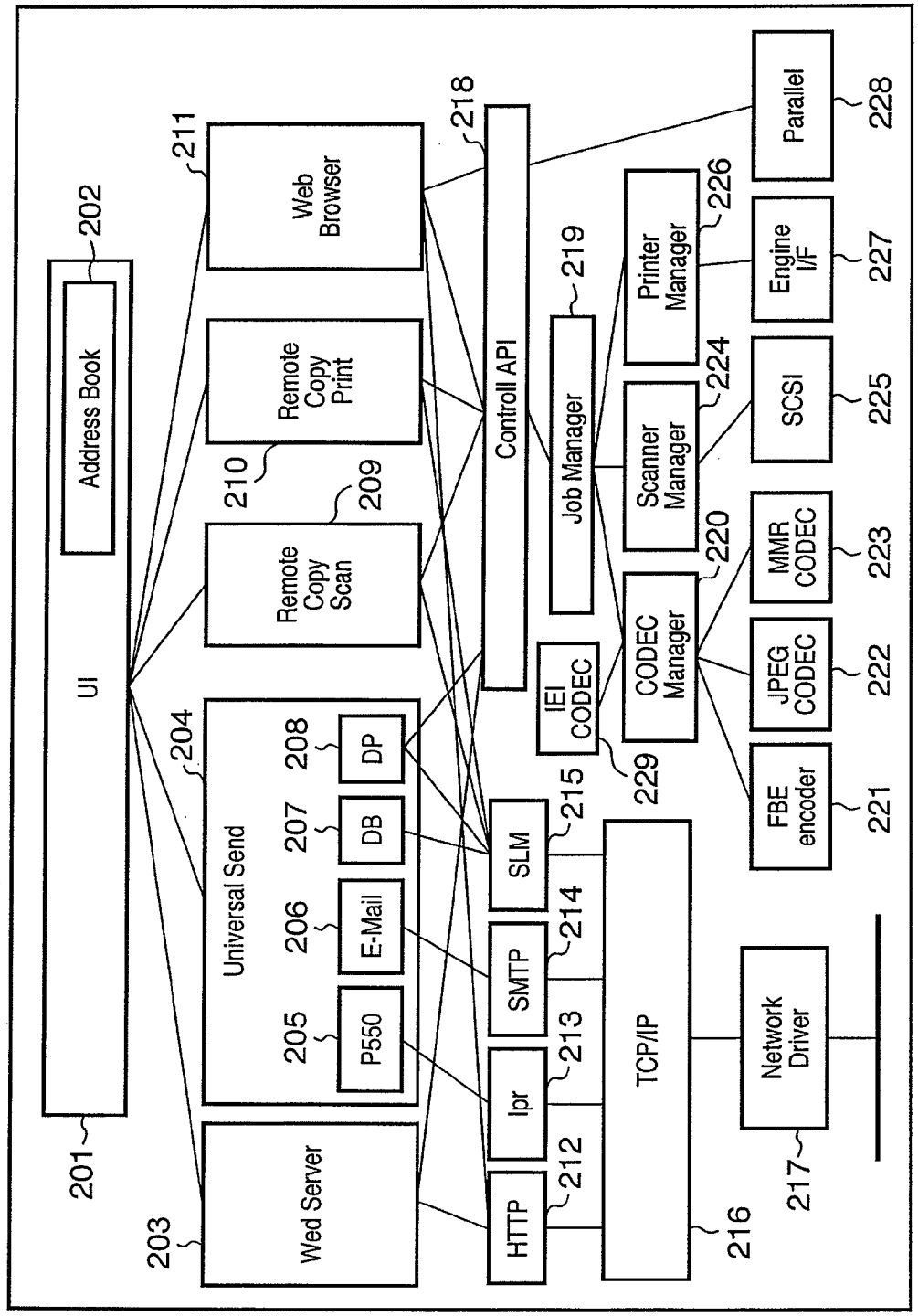
FIG. 2 is a block diagram showing the configuration of software executed by an image processing apparatus.

FIG. 2 is a block diagram showing the configuration of software executed by each image processing apparatus 110.

201 is a user interface (UI) module, serving as an intermediary between apparatus and user operations when an operator performs various operations and settings on the image processing apparatus. This module requests processing, performs data settings or performs other operations by transferring input information to various modules (described later) in accordance with operations by the operator.

202 is an address-book module; that is, a database module that manages data transmission and communication destinations. Data managed by the address-book module 202 is added to, deleted and acquired in accordance with operation commands from the UI module 201. Also, data transmission and communication destination information is provided to modules (described later) from the address-book module 202 as a result of operations by an operator.

203 is a Web server module, notifying management information of the image processing apparatus to a Web client (e.g., desktop computer 103) in response to a request from the Web client. This management information is acquired via a universal send module 204, a remote copy scan module 209, a remote copy print module 210, and a control API 218 (described later). Also, this management information is notified to a Web client via an HTTP module 212, a TCP/IP communication module 216 and a network driver 217 (described later).

The universal send module 204 is responsible for data delivery. This module distributes data instructed by the operator via the UI module 201 to a communication (output) destination instructed in the same way. Also, if the generation of distribution data using a scanner function of the apparatus is instructed by the operator, data is generated by operating the apparatus via the control API 218 (described later).

205 is a P550 module that is included in the universal send module 204 and executed when a printer has been specified as the output destination. 206 is an e-mail module. This e-mail module 206 is included in the universal send module 204 and executed when an e-mail address has been specified as the communication destination. 207 is a DB module that is included in the universal send module 204 and executed when a database has been specified as the output destination. 208 is a DP module that is included in the universal send module 204 and executed when a similar image processing apparatus has been specified as the output destination.

209 is a remote copy scan module. This module reads image information using the scanner function of the image processing apparatus, and outputs the read image information to another image processing apparatus connected by a network or the like. As a result, it is possible using a plurality of image processing apparatuses to realize a copy function originally realized by a single apparatus.

210 is a remote copy print module. This module uses a plurality of image processing apparatuses to realize a copy function originally realized by a single apparatus, by using a printer function of the image processing apparatus to output image information obtained by another image processing apparatus connected by a network or the like.

211 is a Web browser module. This module reads and displays information from different websites on the Internet or an intranet. This module also provides a Web pull print function for acquiring and printing out information from a website. The configuration of the Web browser is described in detail later.

212 is an HTTP module. This module is used when the image processing apparatus performs communication by HTTP (Hypertext Transfer Protocol). The HTTP module 212 provides the Web server module 203 and the Web browser module 211 with a communication function using the TCP/IP communication module 216 (described later). The HTTP module 212 also provides a communication function that corresponds to various protocols used by the Web including HTTP and in particular uses a security compatible protocol.

213 is an lpr module. This module provides the P550 module 205 in the universal send module 204 with a communication function using the TCP/IP communication module 216 described below.

214 is an SMTP module. This module provides the e-mail module 206 in the universal send module 204 with a communication function using the TCP/IP communication module 216 described below.

215 is a SLM (salutation manager) module. This module provides the DB module 207 and the DP module 208 in the universal send module 204, as well as the remote copy scan module 209 and the remote copy print module 210 with a communication function using the TCP/IP communication module 216 described below.

216 is TCP/IP communication module. This module provides the above modules with a network communication function using the network driver 217 described below. 217 is a network driver, controlling the portions physically connected to the network.

218 is a control API. This provides upstream modules such as the universal send module 204 with an interface to downstream modules such as a job manager module 219 (described below). This reduces the dependency relationship between upstream and downstream modules, and enables the diversability of the modules to be enhanced.

219 is a job manager module. This module interprets the various processing instructed by the above modules via the control API 218, and provides instructions to modules (220, 224, 226) as described below. The job manager module 219 also centrally manages the hardware-like processing executed in the image processing apparatus.

220 is a CODEC manager module 220. This module manages and controls data compression and decompression out of the processing instructed by the job manager module 219.

221 is an FBE encoder module. This module uses FBE format to compress data read as a result of scan processing executed by the job manager module 219 and a scan manager module 224 (described below).

222 is a JPEG CODEC module. This module performs JPEG compression on read data and JPEG decompression on print data in the scan processing executed by the job manager module 219 and the scan manager module 224 or the print processing executed by a print manager module 226.

223 is a MMR CODEC module. This module performs MMR compression on read data and MMR decompression on print data in scan processing executed by the job manager module 219 and the scan manager module 224 or print processing executed by the print manager module 226.

229 is an IEI CODEC module. This module decodes information embedded in read image data and embeds information in print data in scan processing executed by the job manager module 219 and the scan manager module 224 or print processing executed by the print manager module 226. The embedding of information in image data is performed using encoding technology such as barcoding or digital watermarking. The IEI CODEC module 229 also supports character recognition that involves recognizing characters in the images of image data using area separation and OCR technology, and converting the characters to text data as a type of decoding technology. Further, the IEI CODEC module 229 also supports conversion to image data from text using a raster image processor, and the overlaying of converted image data and the original image data as a type of encoding technology (information embedding technology).

224 is a scan manager module. This module manages and controls scan processing instructed by the job manager module 219.

225 is a SCSI driver that mediates communication between the scan manager module 224 and a scanner portion connected internally to the image processing apparatus.

226 is a print manager module. This module manages and controls print processing instructed by the job manager module 219.

227 is an engine I/F module. This module provides an interface between the print manager module 226 and a printing portion.

228 is a parallel port driver that provides an interface for when data is output to an output device (not shown) via a parallel port.

Hardware Configuration of Image Processing Apparatus

Figure 3:
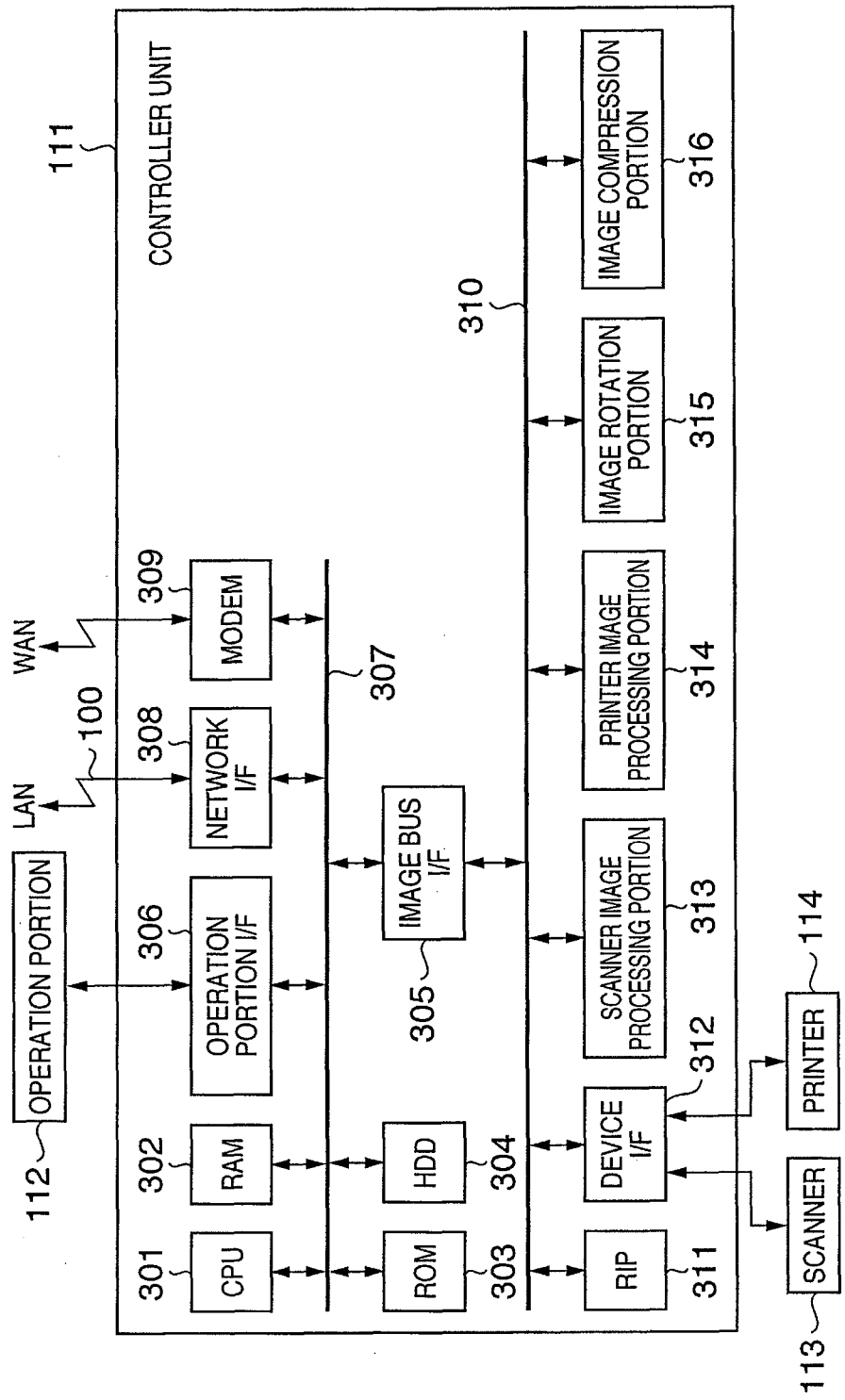
FIG. 3 is a block diagram showing the hardware configuration of the image processing apparatus.

FIG. 3 is a block diagram showing the hardware configuration of the image processing apparatus 110.

The controller unit 111 performs input/output of image information and device information by connecting at one end to the scanner 113, which is an image input device, or the printer 114, which is an image output device, and at the other end to a LAN 100 or a public circuit (WAN).

The CPU 301 controls the entire controller unit 111. A RAM 302 is a system work memory used for operating the CPU 301. The RAM 302 is also an image memory for temporarily storing image data. A ROM 303 is a boot ROM that stores a system boot program. An HDD 304 is a hard disk drive, storing system software and image data.

An operation unit I/F 306 is responsible for the interface with the operation portion (UI) 112, and outputs to the operation portion 112 image data to be displayed on a display device of the operation portion 112. The operation unit I/F 306 also acts to convey information input by a user via the operation portion 112 to the CPU 301.

A network I/F 308 is responsible for the connection with the LAN 100, and performs information input/output in relation to the LAN 100. A modem 309 is responsible for the connection with the public network, and performs information input/output in relation to the public network. The above devices are disposed on a system bus 307.

An image bus I/F 305 is a bus bridge that connects the system bus 307 and an image bus 310 for high-speed transfer of image data, and converts the data structure. The image bus 310 is configured by a PCI bus or IEEE 1394.

The following devices are disposed on the image bus 310. A raster image processor (RIP) 311 converts PDL code transmitted from a client or the like on a network into a bitmap image. A device I/F portion 312 connects the scanner 113 and the printer 114, which are image input/output devices, to the controller unit 111, and performs synchronous/asynchronous conversion of image data.

A scanner image processing portion 313 corrects, processes, and edits input image data. A printer image processing portion 314 performs correction and resolution conversion and the like on print output image data, depending on the performance of the printer 114. An image rotation portion 315 rotates image data. An image compression portion 316 performs JPEG compression/decompression on multivalued image data, and JBIG, MMR and MH compression/decompression on binary image data.

Figure 4:
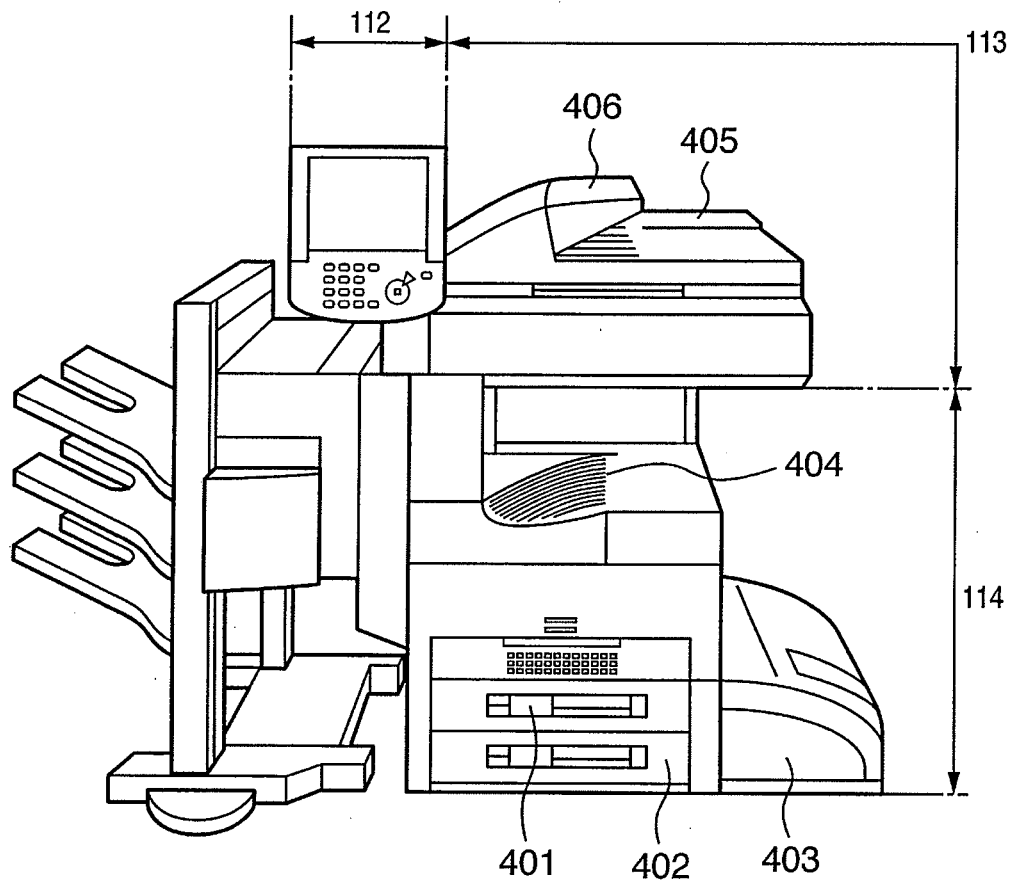
FIG. 4 is a perspective view showing the external appearance of the image processing apparatus.

FIG. 4 is a perspective view showing the external appearance of the image processing apparatus 110.

The scanner 113, which is an image input device, generates raster image data by illuminating an image on paper that forms the manuscript and scanning a CCD line sensor (not shown).

The user sets the manuscript paper on a tray 406 of a manuscript feeder 405, and instructs data reading on the operation portion 112. As a result, the CPU 301 of the controller unit 111 provides an instruction to the scanner 113, the manuscript paper set in the tray 406 is fed one sheet at a time, and reading of the manuscript image using the scanner 113 is started.

The printer 114, which is an image output device, prints raster image data onto paper. This is achieved with an electrophotographic technique using a photosensitive drum or a photosensitive belt, or with an inkjet technique that involves printing images directly onto paper by discharging ink from a fine nozzle array, although any technique is acceptable. Note that the printing operation is started by an instruction from the CPU 301.

The printer 114 has a plurality of paper feed stages so as to enable different paper sizes or different paper orientations to be selected, and paper cassettes 401, 402 and 403 correspond to these. Also, a discharge tray 404 receives printed paper.

Figure 5:
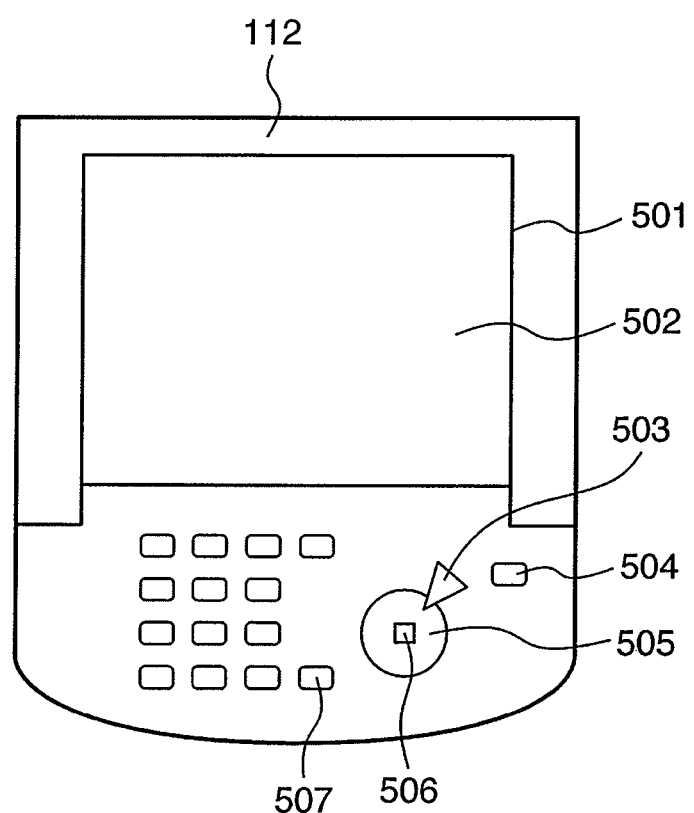
FIG. 5 is a plan view showing the configuration of an operation portion of the image processing apparatus.

FIG. 5 is a plan view showing the configuration of the operation portion 112 of the image processing apparatus 110. An LCD display portion 501 is configured with a touch panel sheet 502 stuck on an LCD (liquid crystal display), and displays operation screens and soft keys of the image processing apparatus 110. Also, if a displayed key is pressed, position information showing the position that was pressed is conveyed to the CPU 301 of the controller unit 111.

A Start key 505 is operated when starting the reading of a manuscript image. In the middle of the Start key 505 is a green and red two-color LED display portion 506 that shows by the colors whether or not the Start key 505 is operable. A Stop key 503 is operated when the user wants to stop the operation of the image processing apparatus 110 while it is running. An ID key 507 is operated when inputting the user ID of the user. A Reset key 504 is operated when initializing the settings from the operation portion 112.

Figure 6:
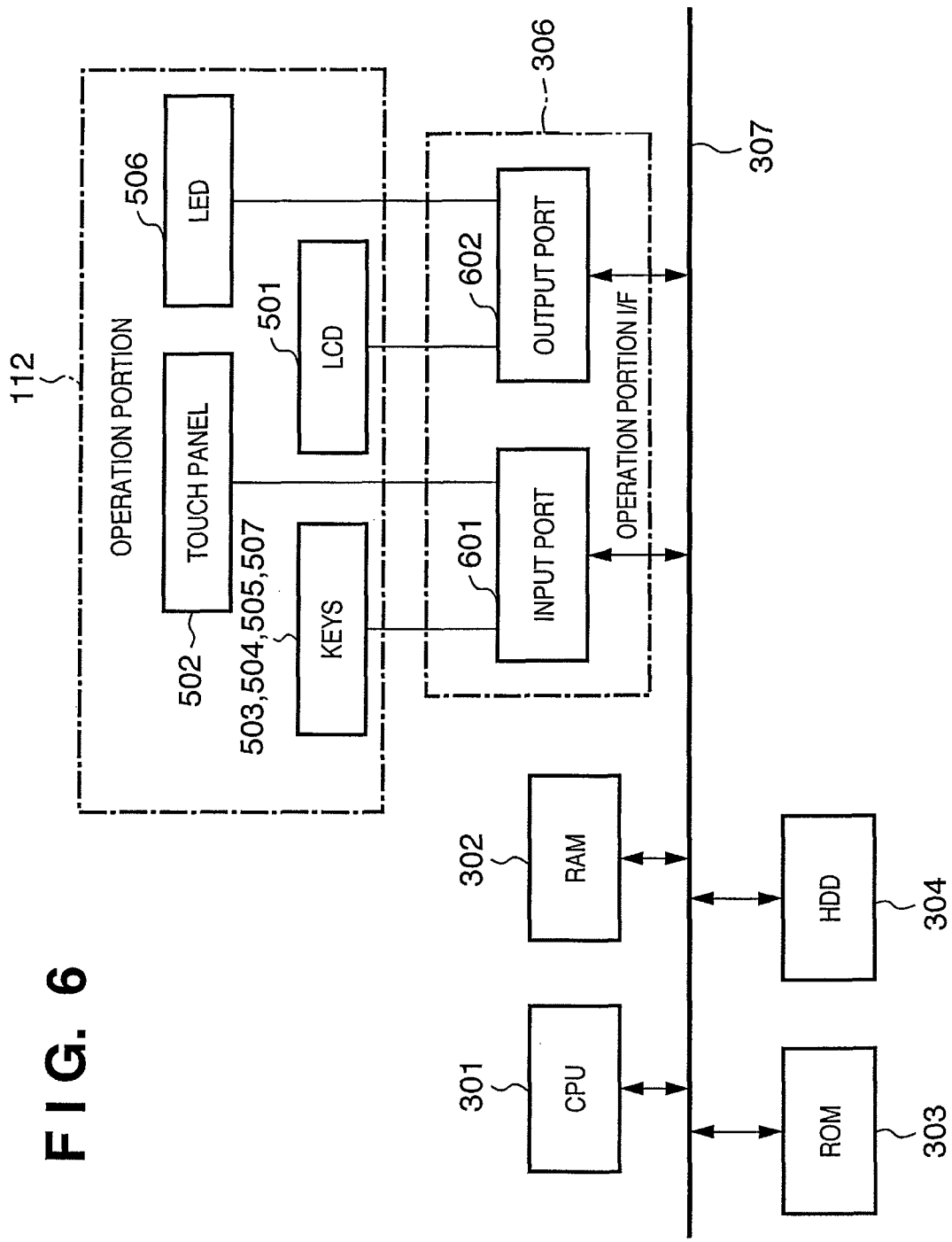
FIG. 6 is a block diagram showing the internal configuration of the operation portion and an operation portion I/F of the image processing apparatus in correspondence with the internal configuration of a controller unit.

FIG. 6 is a block diagram showing the internal configuration of the operation portion 112 and the operation portion I/F 306 of the image processing apparatus 110 in correspondence with the internal configuration of the controller unit 111.

As mentioned above, the operation portion 112 is connected to the system bus 307 via the operation portion I/F 306. Connected to the system bus 307 are the CPU 301, the RAM 302, the ROM 303, and the HDD 304.

The CPU 301 controls access to the various devices connected to the system bus 307 as a whole, based on control programs and the like stored on the ROM 303 and the HDD 304. The CPU 301 also reads input information from the scanner 113 connected via the device I/F 312, and outputs an image signal as output information to the printer 114 connected via the device I/F 312. The RAM 302 functions as a main memory, a work area and the like of the CPU 301.

User input information from the touch panel sheet 502 or hard keys 503, 504, 505 and 507 is passed to the CPU 301 via an input port 601. The CPU 301 generates display image data based on the user input information and the control programs, and outputs display screen data to the LCD display portion 501 via an output port 602 that controls a screen output device. The CPU 301 also controls the two-color display portion 506 if necessary.

Figure 7:
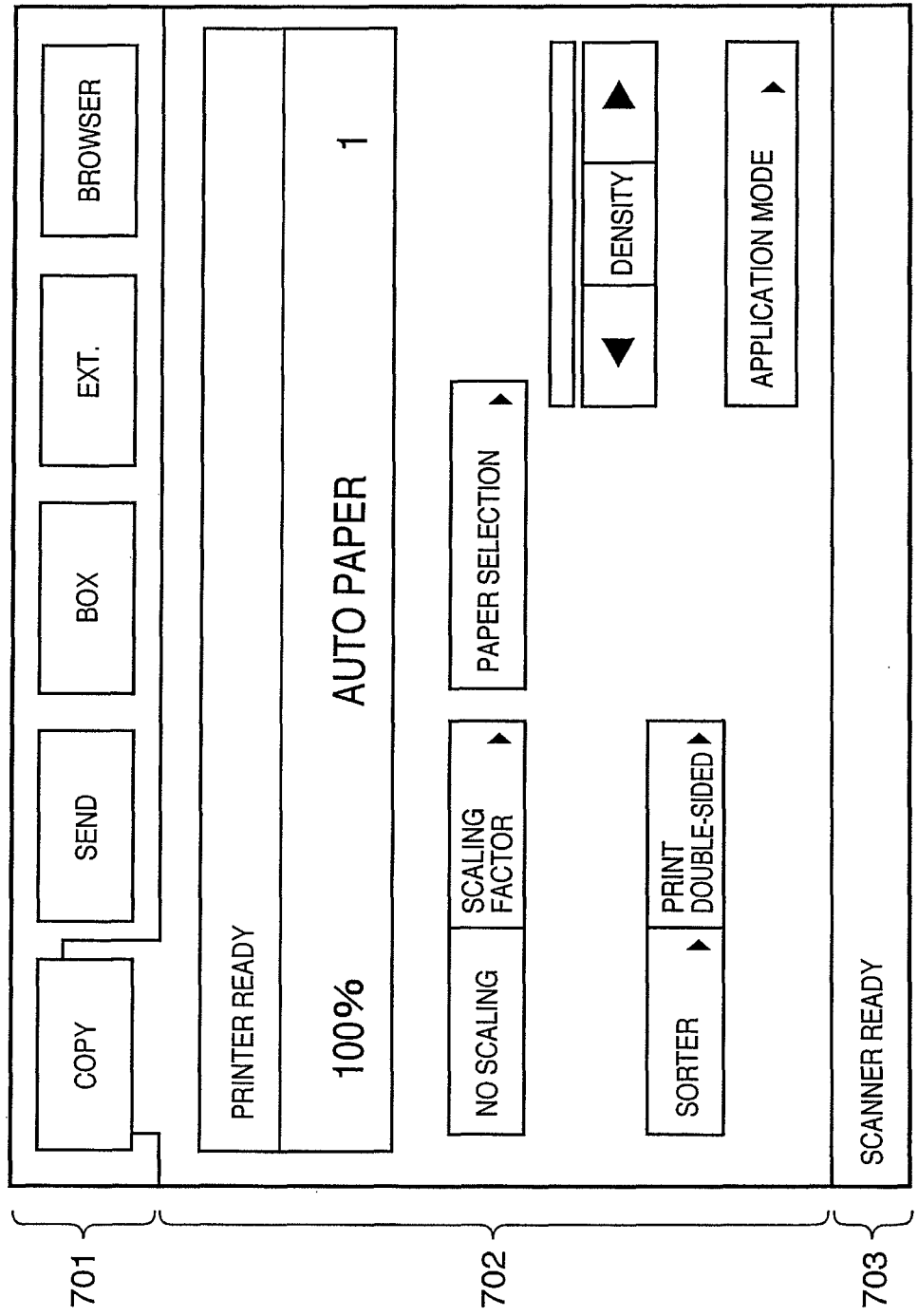
FIG. 7 shows an exemplary standard operation screen displayed on the operation portion of the image processing apparatus.

FIG. 7 shows an exemplary standard operation screen displayed on the LCD display portion 501 of the operation portion 112 in the image processing apparatus 110. The group of buttons arranged in the top portion 701 of FIG. 7 is for selecting one of the functions provided by the image processing apparatus 110.

The copy function is for obtaining a copy of a manuscript by using the printer 114 to print manuscript image data read by the scanner 113. The send function is for sending manuscript image data read by the scanner 113 or image data stored on the HDD 304 to various output destinations. In terms of output destinations, there are a variety of output destinations to which data is transmittable via the network I/F 308 using various protocols. There are also output destinations to which data is transmittable via the modem 309 using protocols for facsimiles and the like. A plurality of output destinations can be selected from these and data sent to the selected output destinations.

The box function is for browsing, editing, printing and sending document files such as image data and code data stored on the HDD 304. The document files stored on the HDD 304 include manuscript image data read by the scanner 113, data downloaded via the network I/F 308, and print data received from other apparatuses via the network I/F 308. Facsimile data and the like received from other apparatuses via the modem 309 is also stored on the HDD 304. The box function can be used as an electronic mailbox in the user's office environment. The box function can also be used in secured printing for enhancing the confidentiality of PDL print jobs by delaying printing onto paper until a password is input. The extension function is for calling various extension functions such as locking for using the scanner 113 from an external apparatus. The browser function is for browsing websites.

In the middle portion 702 of FIG. 7 is displayed an operation screen in the case of the copy function having been selected. The bottom portion 703 of FIG. 7 is a status display area in which various messages are displayed to the user such as information about the functions of the image processing apparatus 110 or about the apparatus itself, irrespective of the function selected in the top portion 701.

Operation of Distributed Applications by Web Browser

Figure 8:
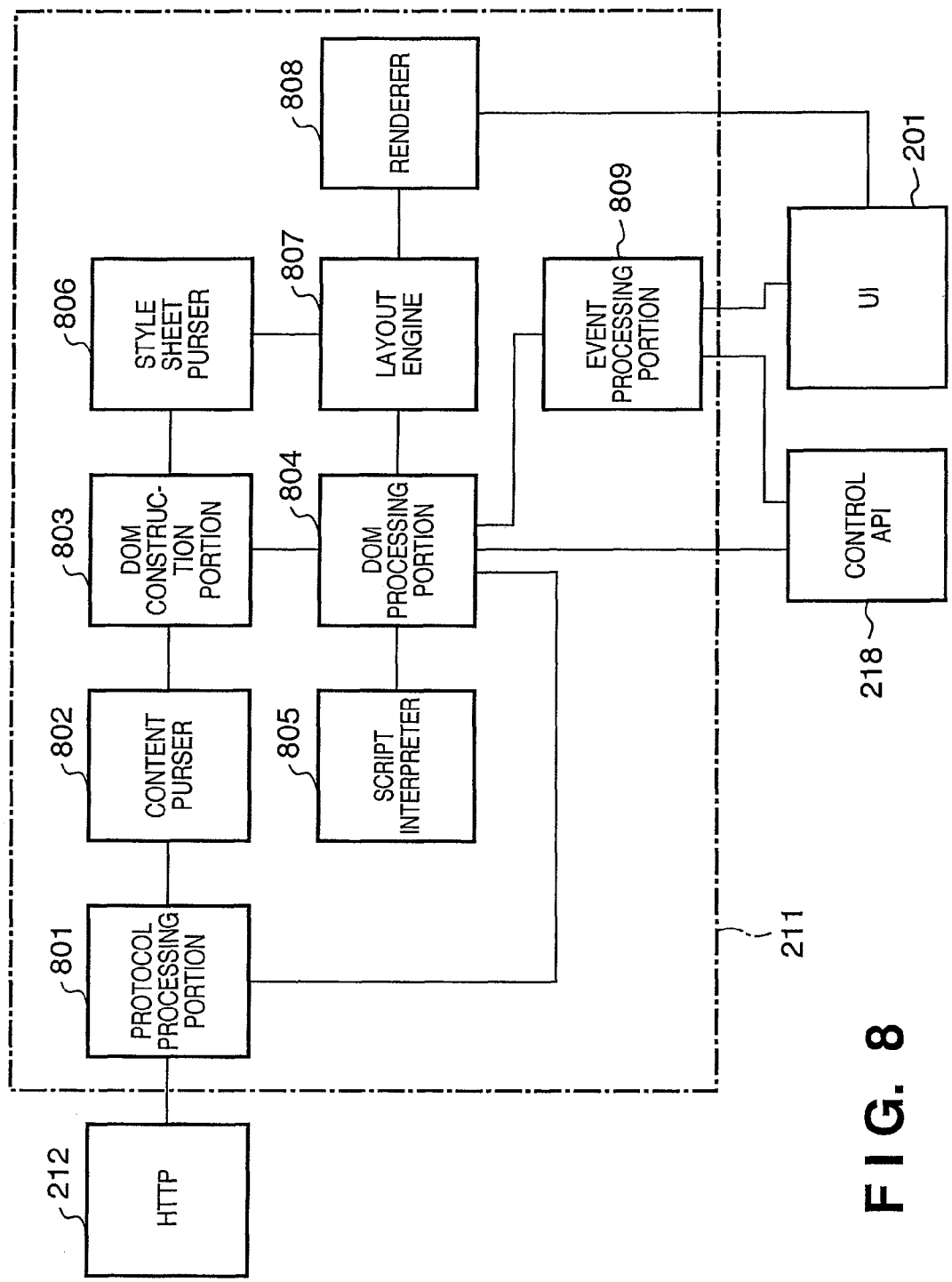
FIG. 8 is a block diagram showing the internal configuration of a Web browser module shown in FIG. 2.

FIG. 8 is a block diagram showing the internal configuration of the Web browser module 211 shown in FIG. 2. A protocol processing portion 801 establishes a connection and communicates with other network nodes via the HTTP module 212. In this communication, an HTTP request is issued for a resource described by a URL and a response is obtained. This process also involves encoding and decoding communication data that meets various encoding formats.

A content purser 802 receives content data presented in a presentation format such as HTML, XML or XHTML from the protocol processing portion 801, and performs lexical analysis and syntax analysis on the received content data to generate parse tree information.

A DOM construction portion 803 receives the parse tree information from the content purser 802, and constructs a Document Object Model (DOM) that corresponds to the structure of the content data. That is, conventional HTML allows various grammatical omissions and there is a broad array of variations. Further, content actually used is often neither well-formed nor valid. In view of this, the DOM construction portion 803 deduces the correct logical structure of content data that is grammatically invalid and attempts to construct a valid DOM, similarly to general Web browsers.

A DOM processing portion 804 stores and manages the DOM constructed by the DOM construction portion 803 in memory as a tree structure representing the nested relationship of the object group. The various processing of a Web browser is realized based on this DOM.

A layout engine 807 recursively determines the presentation on the display of each object according to the tree structure of the object group stored by the DOM processing portion 804, and obtains the layout of the entire document as a result. The presentation on the display of each object is sometimes expressly specified in a style sheet format such as a Cascading Style Sheet (CSS) using description embedded in the document or description in a separate file linked from the document.

A style sheet purser 806 analyzes the style sheet associated with a content document.

A layout engine 807 determines the document layout to reflect the result of style sheet analysis.

A renderer 808 generates graphical user interface (GUI) data for displaying on the LCD display portion 501 (FIG. 5)

according to the document layout determined by the layout engine 807. The generated GUI data is displayed on the LCD display portion 501 by the UI 201.

An event processing portion 809 receives the events of operations performed by the user on the touch panel sheet 502 or keys of the operation portion 112, and performs processing that corresponds to each event. The event processing portion 809 also receives apparatus and job state transition events from the control API 218, and performs processing that corresponds to each event. In the tree structure of the DOM managed by the DOM processing portion 804, event handlers that correspond to different types of events are registered per object class and per object instance. The event processing portion 809 determines, according to an event that has occurred, an object that is to handle the processing of the event from a group of objects managed by the DOM processing portion 804, and delivers the event. The object to which the event is delivered executes various processing according to the algorithm of the event handler corresponding to the event. Processing performed by event handlers includes updating the DOM stored by the DOM processing portion 804, instructing the layout engine 807 to redraw, instructing the protocol processing portion 801 to issue an HTTP request, and controlling the image processing apparatus functions by calling the control API 218.

A script interpreter 805 interprets and executes scripts such as JavaScript (registered trademark) (ECMAScript) or the like. A script performs operations on the DOM or the like by being embedded in a document or written into a separate file linked from a document. A content provider can program the dynamic behavior of a provided document using a script.

Figure 9:
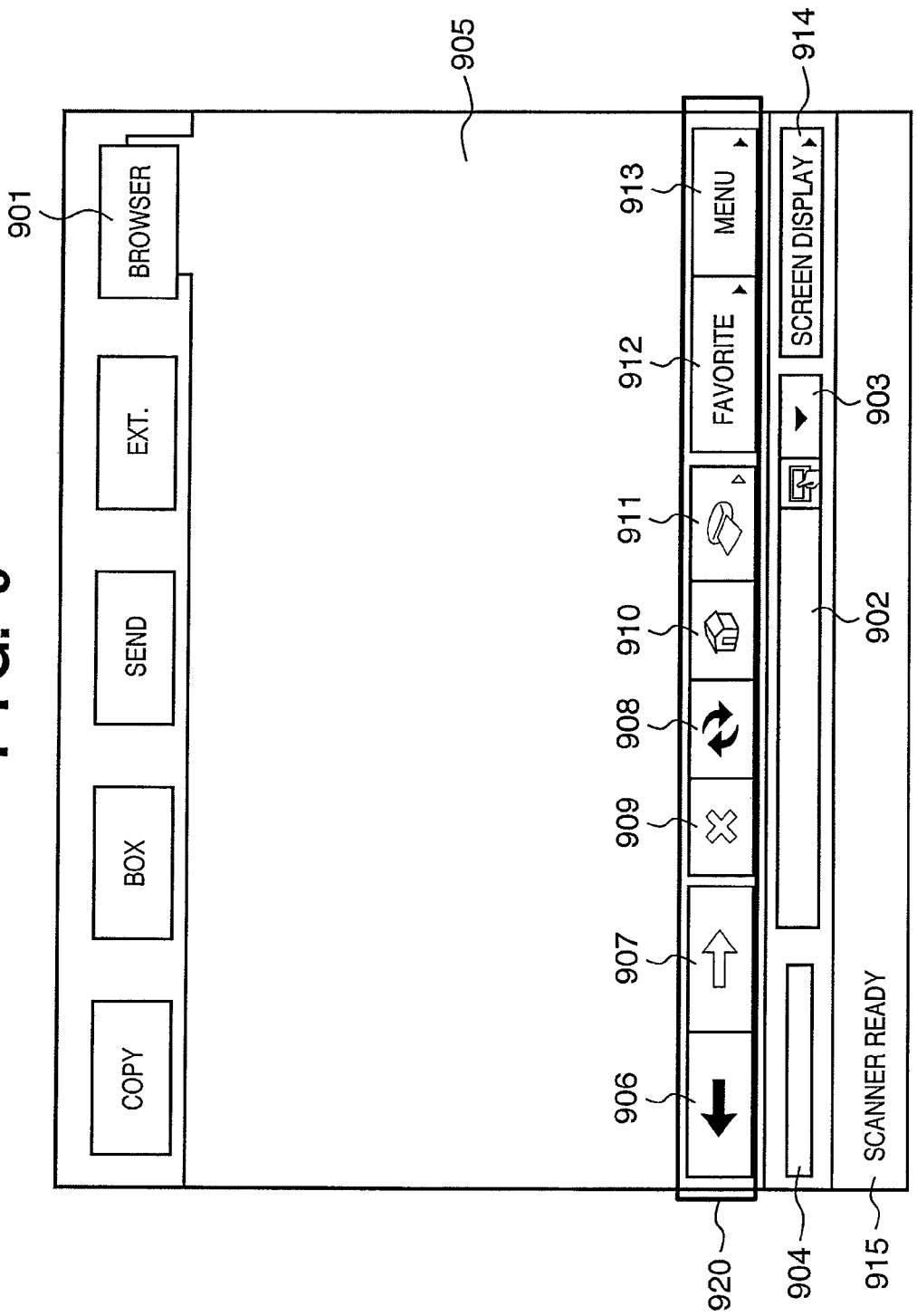
FIG. 9 shows the configuration of a screen displayed when a Web browser function is selected on an LCD display portion shown in FIG. 5.

FIG. 9 shows the configuration of a screen displayed when the Web browser function is selected on the LCD display portion 501 shown in FIG. 5. The tab 901 is for selecting the Web browser function. By selecting this tab, the screen is switched from another function (copy, box, send, extension) to the display screen of the Web browser function. The URL input field 902 is for the user to input the URL of a desired resource. When the user presses this field, a virtual full keyboard (not shown) for inputting characters is displayed. The user is able to input a desired character string using soft keys simulating keycaps disposed on the virtual full keyboard. Once a URL has been input, the Web browser module 211 issues an HTTP request for acquiring the resource.

The URL history call button 903 is for displaying the history of previously requested URLs. By selecting one of the displayed URLs, the user is able to again request a URL that was input before.

The progress bar 904 shows the state of progress of content acquisition processing resulting from the response to the HTTP request. The content display area 905 is where the acquired resource will be displayed.

The toolbar area 920 is where buttons from the Back button 906 to the Menu button 913 (described below) are disposed.

The Back button 906 is a soft key, and when this key is touched, the history of content display is retraced and the content displayed prior to the content currently being displayed is redisplayed. The Forward button 907 is a soft key, and when this key is touched while content is being displayed after retracing the history of content display, display returns to the content displayed immediately after the content currently being displayed. The Refresh button 908 is a soft key for reacquiring and redisplaying content currently being displayed. The Stop button 909 is a soft key for stopping content acquisition processing during execution.

The Home button 910 is for acquiring and displaying the URL of a preset homepage. The Print button 911 is for printing content currently being displayed. Printing is described in detail later. The Favorite button 912 calls dialog boxes for registering the URL of content currently being displayed as a favorite, calling a list of registered URLs, and organizing the list of URLs. The Menu button 913 calls a screen for performing various browser settings. This is described in detail later.

Figure 10:
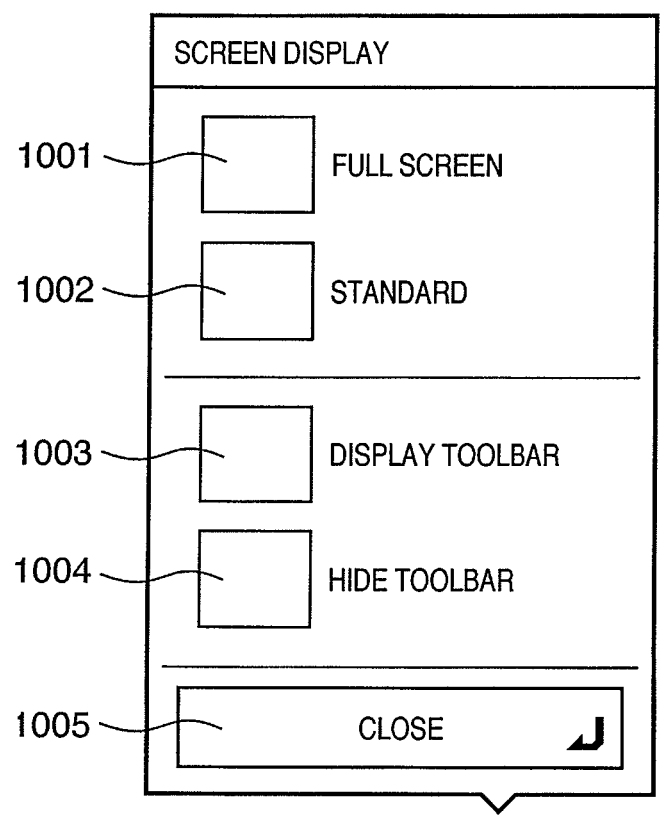
FIG. 10 shows an exemplary screen displayed when a Screen Display button is selected in the Web browser function.

The Screen Display button 914 is for changing the screen display area. When this button is pressed, the screen shown in FIG. 10 is displayed. The buttons 1001 and 1002 are for switching between full screen and standard size. When full screen 1001 is selected, the top portion 701 and the bottom portion 703 are hidden, and the middle portion 702 is displayed over the entire screen. When standard size 1002 is selected, the screen switches to normal display (the top portion 701 and the bottom portion 703 are displayed). The buttons 1003 and 1004 are for switching between displaying and hiding the toolbar. When Hide Toolbar 1004 is selected, the toolbar area 920 is hidden. These switching buttons have all been provided to enable expanded display of the content display area 905. The Close button 1005 closes this screen.

The status area 915 (bottom portion 703) is for displaying messages from the various functions of the image processing apparatus 110. Messages sent from the scanner 113, the printer 114 or other functions for drawing the user's attention are displayed in the status area 915, even during display of the Web browser screen. Similarly, messages from the Web browser function are also displayed in the status area 915. Messages instructed using the URL character string of a link, the title character string of content, or a script are sent from the Web browser function.

Figure 11:
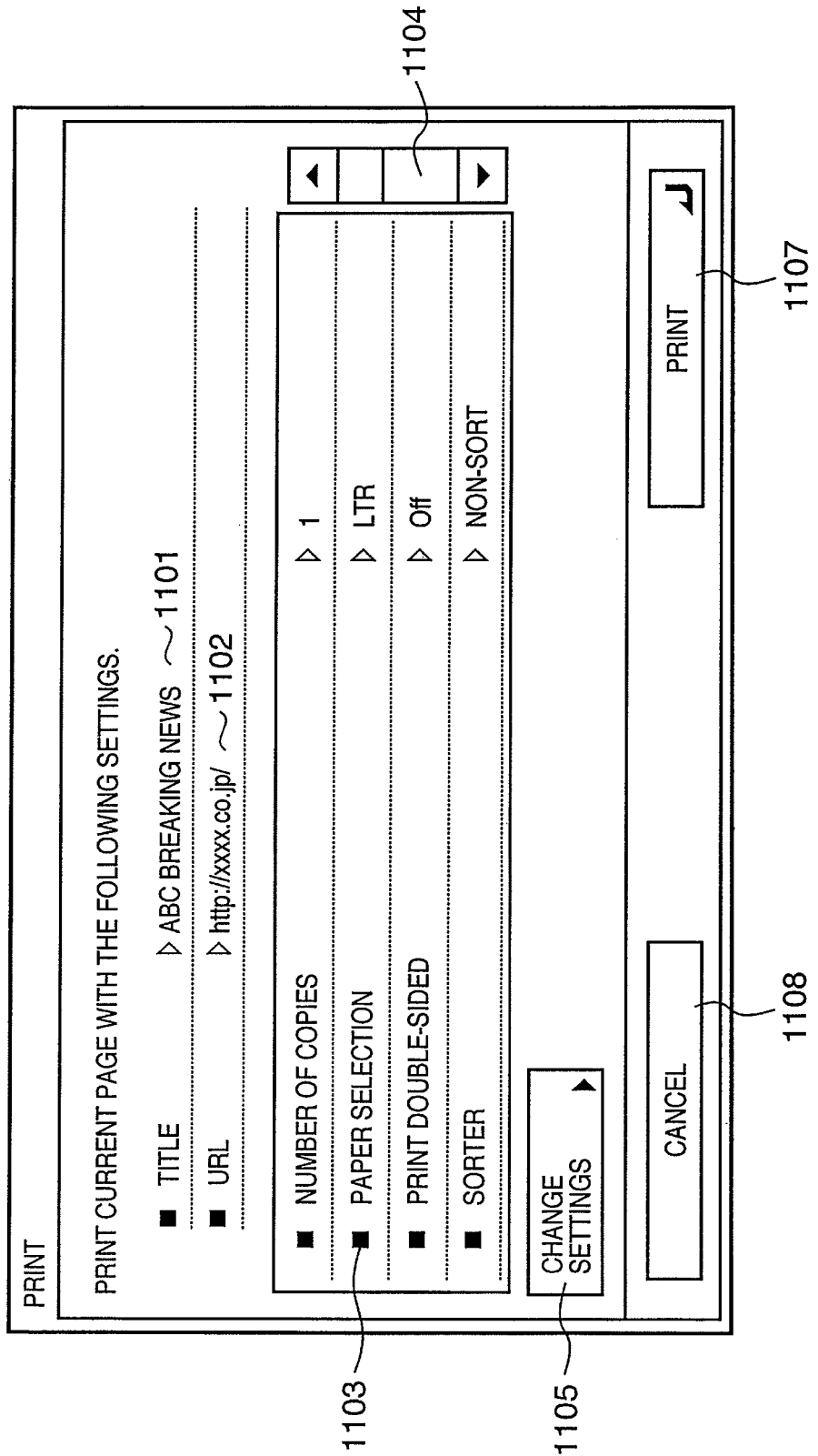
FIG. 11 shows an exemplary screen displayed when a Print button is selected in the Web browser function.

Processing performed when the Print button 911 is pressed is described next. When the Print button 911 is pressed, the print setting screen shown in FIG. 11 is displayed. The area 1101 is for displaying the title of content currently being displayed. The area 1102 is for displaying the URL of content currently being displayed. The area 1103 is for displaying the current print settings. The print setting area 1103 is scrolled by operating the scroll bar 1104, making available print settings that are not displayed. A Change Settings button 1105 is for changing the print settings that have been set. The Print button 1107 is for starting the printing. When this button is pressed, the printer 114 is operated and the Web page currently being displayed is printed out. The Cancel button 1108 is for returning to the screen shown in FIG. 9 without printing out. Note that the print settings displayed in the area 1103 are also applied in scheduled automatic printing (described later).

Figure 12:
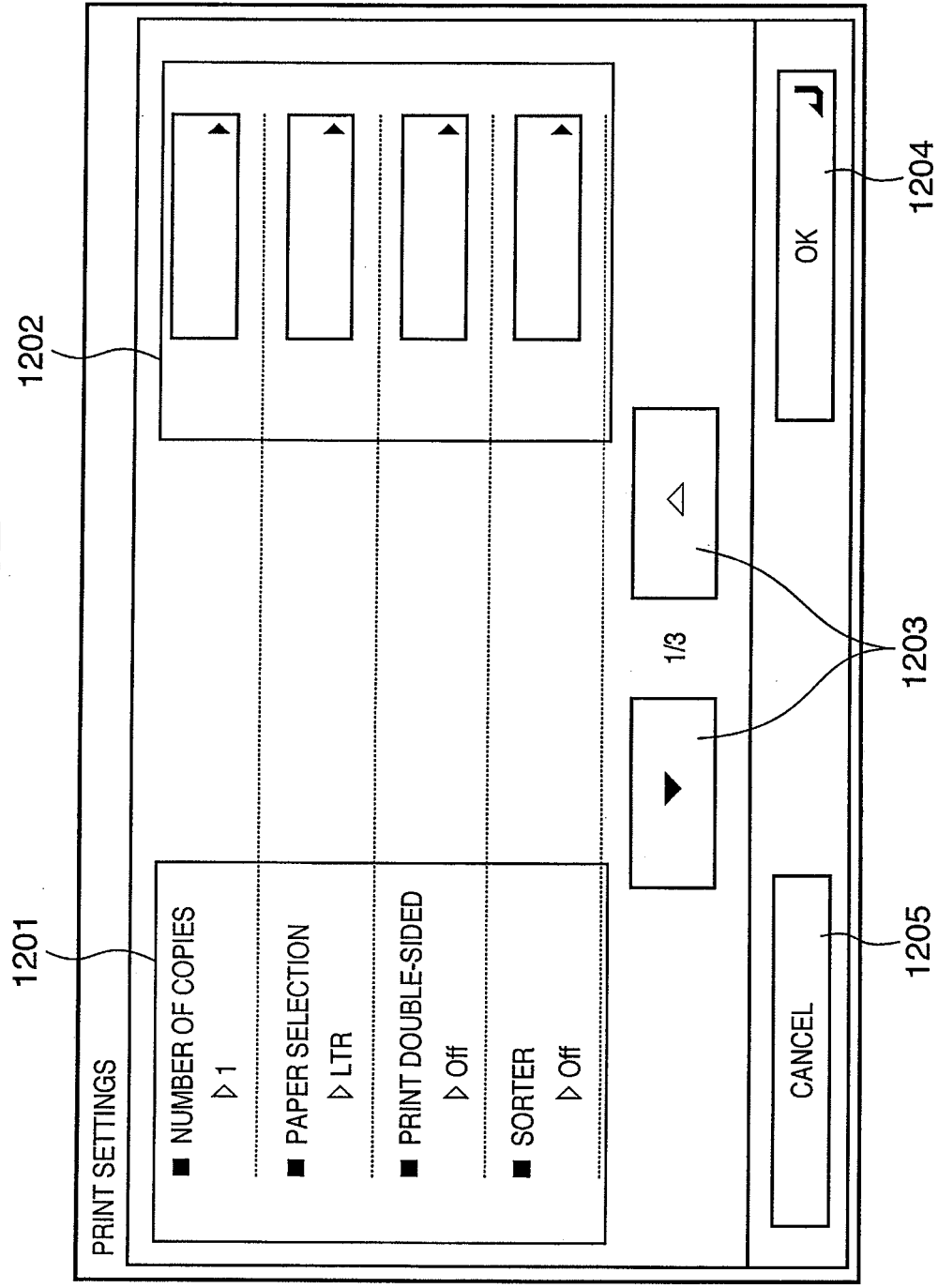
FIG. 12 shows an exemplary screen displayed when a Change Settings button is selected on the screen shown in FIG. 11.

The operation performed when the Change Settings button 1105 is pressed is described next. When the Change Settings button 1105 is pressed, the screen shown in FIG. 12 is displayed. The area 1201 displays the setting items and the respective current setting values. The buttons 1202 are for changing the settings. When one of these buttons is pressed, a screen for changing the respective setting is displayed. The setting screens are not illustrated in detail here. The page switching buttons 1203 are for displaying setting items that could not be displayed on a single screen. The OK button 1204 is for confirming the input settings and returning to the screen in FIG. 11. The Cancel button 1205 is for canceling the settings and returning to the screen in FIG. 11.

The print setting items are described in detail next. Here, settable items are as shown in the following table.

TABLE 1

| | Setting Items | Setting Details |
|---|---|---|
| 1 | Number of copies | 1–9999 |
| 2 | Paper selection | cassette 1–cassette 4 |
| 3 | Print double-sided | ON/OFF |
| 4 | Sorter | Non-sort/sort (per copy)/ group (per page)/staple sort |
| 5 | Print background colors and images | ON/OFF |
| 6 | Print title | ON/OFF |
| 7 | Print date | ON/OFF |
| 8 | Print URL | ON/OFF |
| 9 | Resolution | 150 dpi/300 dpi |

In the above table, item 1 specifies the number of copies to be printed, with a setting from 1 to 9999 being possible. Item 2 is a paper selection for selecting the paper to be used in the print output. Item 3 is a double-sided printing specification for setting whether to perform double-sided printing during output. The sorter item 4 is a finishing setting during output, and can be set to non-sort, sort (per copy), group (per page), and staple sort. Item 5 is for setting whether to print background colors and images. Because characters are sometimes difficult to read when pages set to a black background, for example, are printed despite looking okay when viewed on the display screen, this setting is for preventing this from occurring. Item 6 is a print title setting, and when set to ON, the title (1101) of the URL is additionally printed in the page header. Item 7 is a print date setting, and when set to ON, the output date is additionally printed in the page header. Item 8 is a print URL setting, and when set to ON, the URL (1102) of the page is additionally printed in the page header. Item 9 is a resolution specification for selecting an output resolution of 150 dpi or 300 dpi.

The various settings of the browser called from the Menu button 913 are described next. When the Menu button 913 is pressed, the menu shown in FIG. 13 is displayed. When one of the items is selected, a corresponding screen is displayed and various settings are made available. 1301 is a History menu that makes it possible to display a list of pages previously displayed, and to request these pages again by selecting from the list. 1302 is an Add to Page Memo menu that makes it possible to store the current page to the HDD 304. 1303 is a Page Memo List that makes it possible to display stored pages as page memos, and to edit the page memo list. 1304 is a Text Size menu that displays a screen for selecting the size of text on the display screen from one of "Large", "Medium" and "Small". 1305 is an Encoding menu for specifying encoding for when an acquired page is displayed. 1306 is a Zoom menu for specifying the display scaling factor. Selection is possible from one of "50%", "75%", "100%", "125%", "150%", "175%" and "200%". 1307 is a Specification Setting menu for performing various other settings. The setting of scheduled printing (described later) is also performed from the Specification Setting menu 1307.

Description of Web Server and Update Information

The Web servers 101 and 102 are described next.

The Web servers 101 and 102 are general Web servers that transfer the data of stored resources in response to HTTP and HTTPS requests from HTTP clients. Resources accessed by clients using HTTP include static data files such as HTML and image files stored in the nonvolatile memory of the HDD on the Web server, or data dynamically generated using programs executed by the CPU. This resource information is collectively referred to as resources.

A Web server supplies the update information of Web pages supplied by the server, using data in an XML format such as RSS. Consequently, this XML data is also included in resources accessed by clients using HTTP.

Note that the Web server may be on an intranet as with 101 or on the Internet as with 102. A device such as the image processing apparatus 110, for example, may also have the functions of a Web server.

Figure 14:
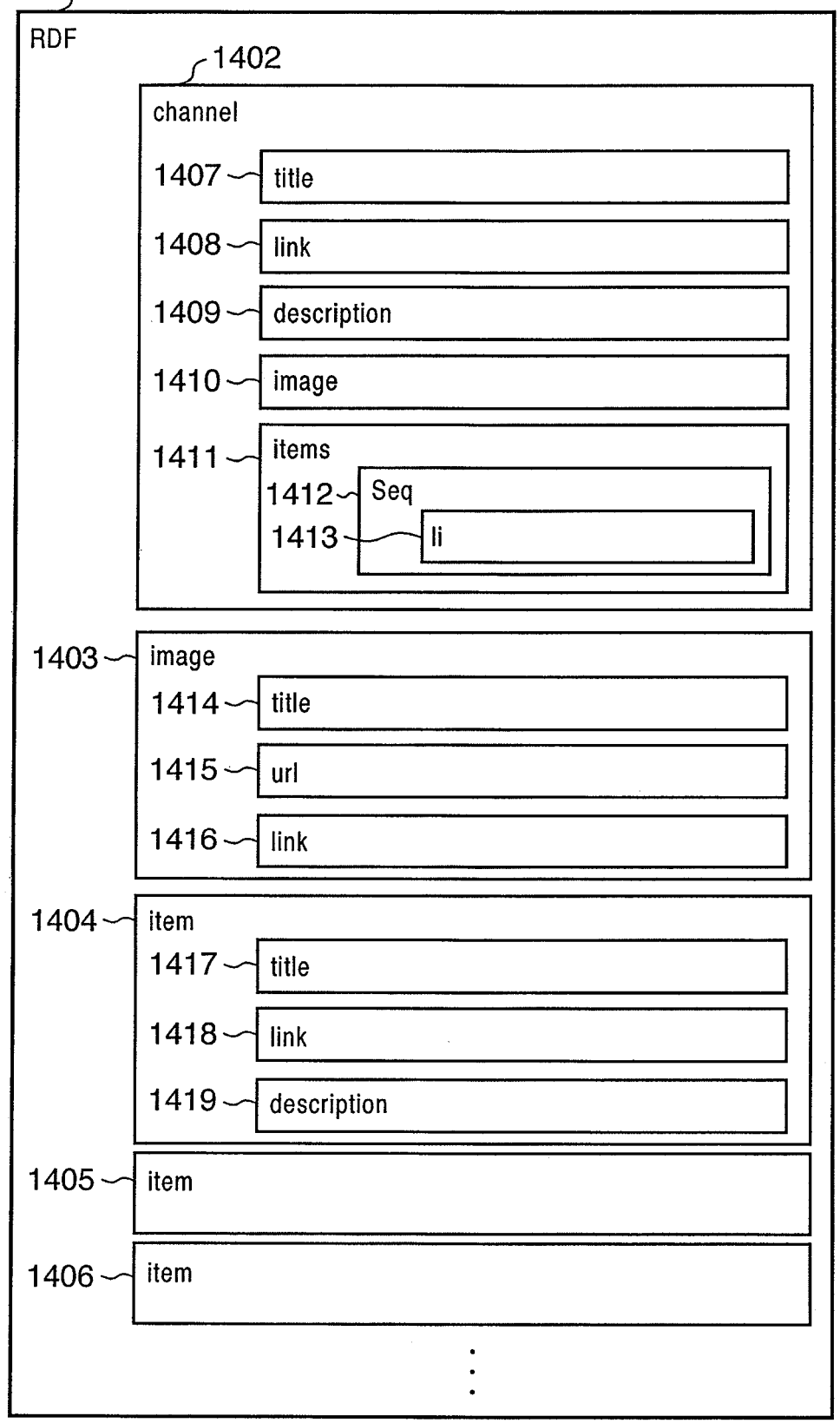
FIG. 14 shows the structure of an exemplary XML format used in supplying update information of a website.

FIG. 14 shows the structure of an exemplary XML format used in supplying update information of a Web page. Although a number of XML formats are known such as Atom and different versions of RSS as a format of update information of a Web page, description using RSS 1.0 is given here as an example. In FIG. 14, the inclusion relation of the blocks signifies the inclusion relation of XML elements.

The RDF element 1401 is the most significant element in an XML document. The RDF element includes a channel element 1402, an image element 1403, and item elements 1404, 1405 and 1406.

The channel element 1402 contains basic information related to the update information in general. This element equates to an RDF-like subject node. The channel element includes a title element 1407, a link element 1408, a description element 1409, an image element 1410, and an items element 1411. The title element 1407 indicates the title of this update information.

The link element 1408 indicates the URI of the site handled by this update information. The description element 1409 contains a description of the details or functions of the site being handled by this update information. The image element 1410 contains a URI identifying a logo or other image resource of the site handled by this update information. The image resource is described in detail in the image element 1403 (described later). The items element 1411 provides an index of the item element groups 1404, 1405, and 1406. Update information URIs are shown by li elements 1413 listed in a Seq element 1412. The image element 1403 presents an image such as a logo. This element includes a title element 1414, a url element 1415, and a link element 1416.

The title element 1414 indicates the title of the image, and is sometimes used as substitute text for the image. The url element 1415 contains the URI of the image resource. The link element 1416 contains a URI for use as a link when displaying a hyperlink that anchors the image. The item elements 1404, 1405, 1406 and the like are an arrangement of a plurality of elements that respectively present individual pieces of update information. Each of these elements includes a title element 1417, a link element 1418, and a description element 1419.

The title element 1417 contains the title of the update information. The link element 1418 contains the URI of the update information. The description element 1419 contains a description of the update information.

FIG. 15 shows exemplary update information for the website of a newspaper supplied in RSS 1.0 format. The same reference characters are attached to elements described in FIG. 14.

The websites on the Web servers 101 and 102 generate update information files either automatically or manually, and supply Web clients with the generated files, similarly to other resources. The format of the update information is not limited to RSS 1.0, and may be any format, such as Atom or other versions of RSS. The generation of an update information file, being publicly known, is not described here.

Whatever the format, the update information file contains information such as the title, summary, and URL of the text of the page updated at the site. Consequently, the image processing apparatus 110 is able to automatically print update information by acquiring this update information file, and analyzing and printing out the contents of the file. Scheduled automatic printing is realized by doing this periodically.

Description of Scheduled Automatic Printing

The scheduled automatic printing function in the image processing apparatus 110 is described next. A screen for setting scheduled automatic printing can be called using the Menu button 913 shown in FIG. 9. When this button is pressed, the setting screen for scheduled automatic printing shown in FIG. 16 is displayed.

Figure 16:
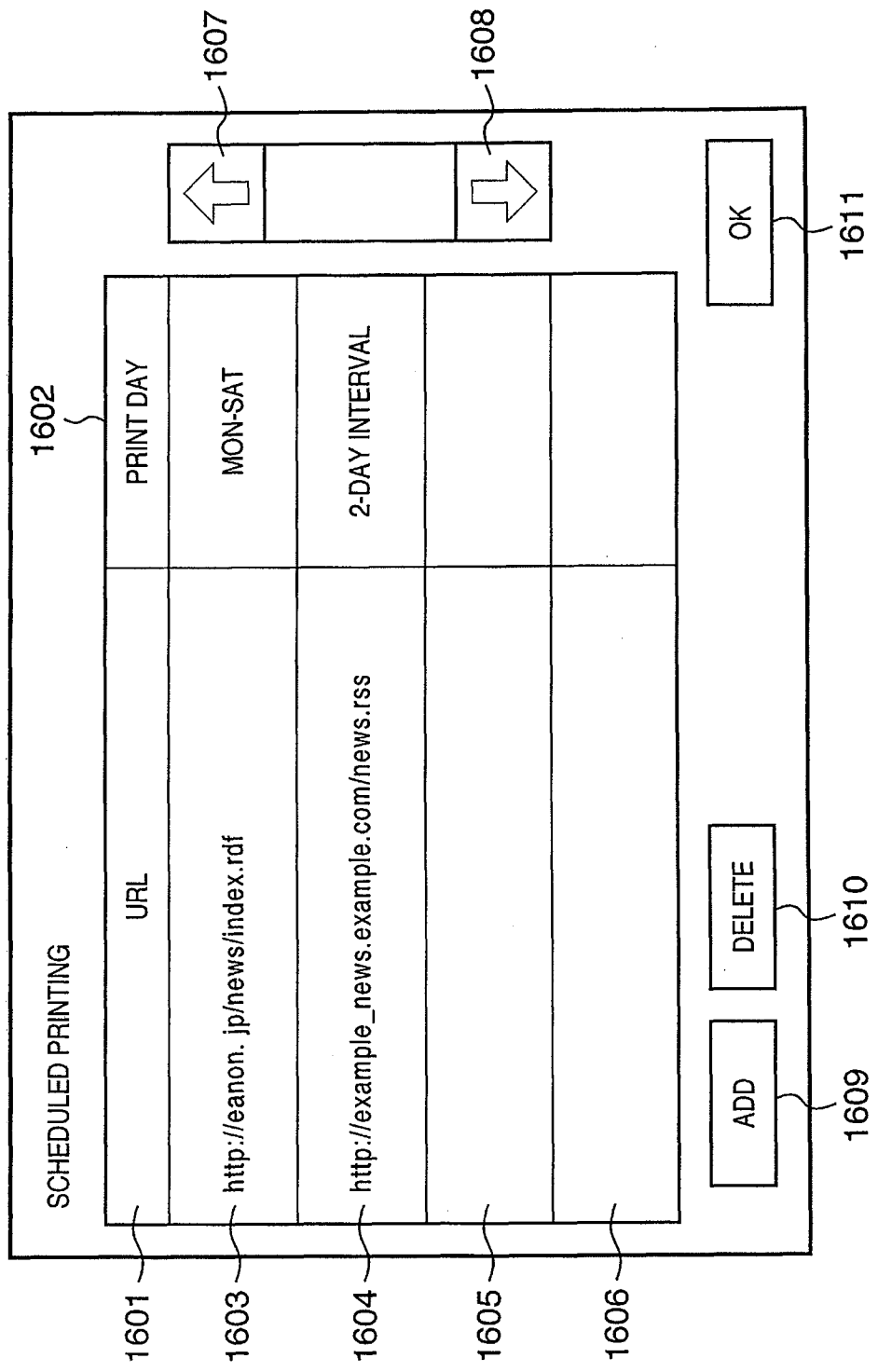
FIG. 16 shows an exemplary scheduled print setting screen.

Shown in FIG. 16 is a list of jobs set by the user for scheduled printing. The display items in the list are a URL 1601 and a Print Day 1602. Four set jobs from 1603 to 1606 are displayable on a single screen, and if the list is longer than this, it can be scrolled using the arrow keys 1607 and 1608.

When the Add button 1609 is pressed, an Add Scheduled Print Job screen is displayed (described in detail below). When one of the lines of the set jobs 1603 to 1606 is pressed, that line is highlighted and placed in a selected state. When the Delete button 1610 is pressed with one of the lines in the selected state, the selected job is deleted from the list. When the OK button 1611 is pressed this screen is closed.

Figure 17:
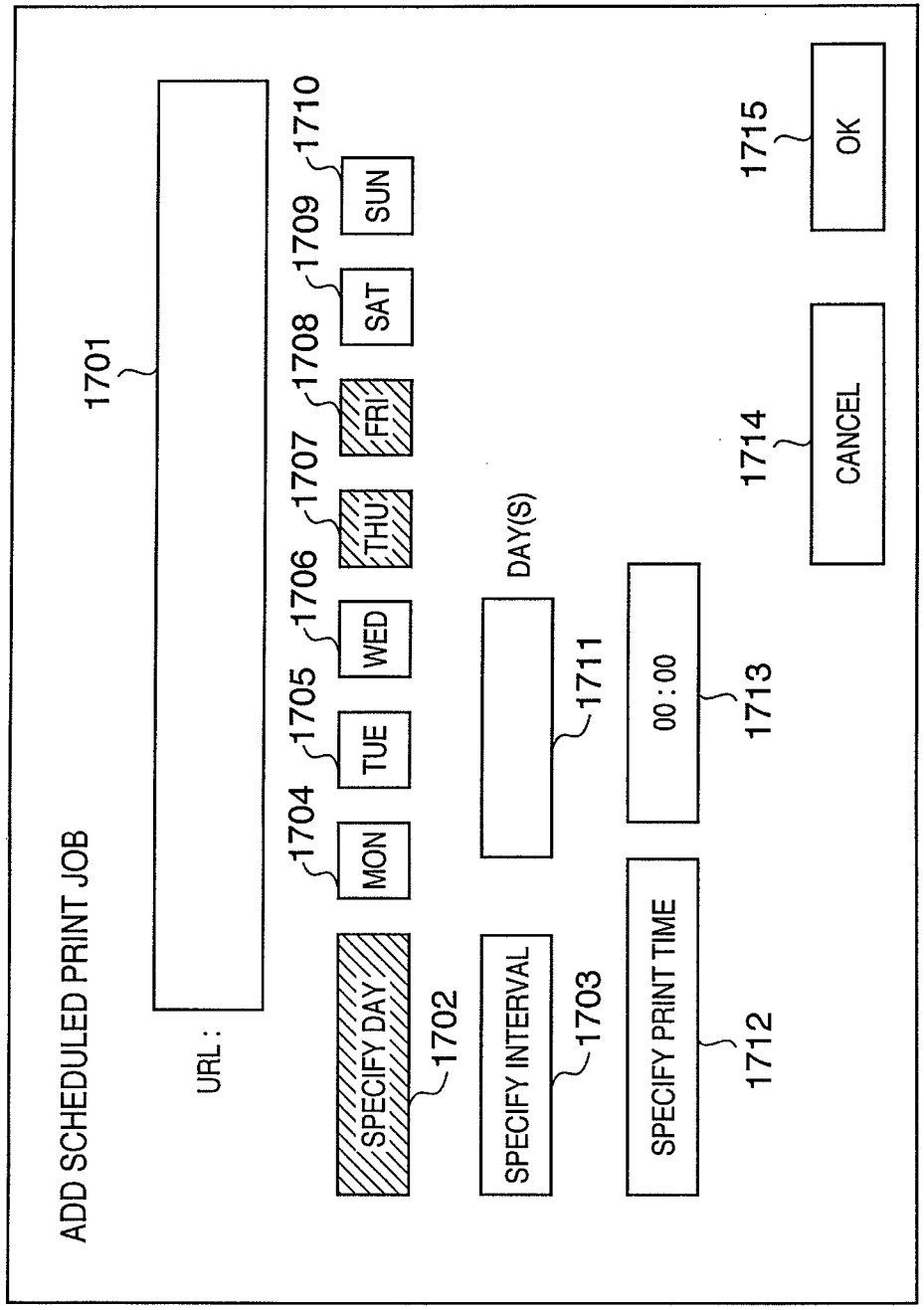
FIG. 17 shows an exemplary Add Scheduled Print Job screen.

The Add Scheduled Print Job screen is described next. When the Add button 1609 is pressed, the Add Scheduled Print Job screen shown in FIG. 17 is displayed. 1701 is a URL input field, and when this area is pressed, a virtual keyboard screen (not shown) is displayed. The user inputs the URL of an XML file for the update information of a desired site from the displayed virtual keyboard. The input URL is displayed in 1701. Note that in the case where the screen in FIG. 17 is displayed while a particular homepage is being displayed in the content display area 905, the URL of that page may be displayed in the URL input field 1701 by default.

The Specify Day button 1702 and the Specify Interval button 1703 are for setting the date specification method for scheduled printing, with one of these buttons being enabled. The enabled button is highlighted. The figure shows that the Specify Day button 1702 is enabled. When day specification is enabled, the Day buttons 1704 to 1710 are also enabled. More than one Day button can be selected, and selected buttons are highlighted. If interval specification is enabled, the cursor moves to an interval input field 1711, and numeric values input from a numeric keypad are displayed.

When the Specify Print Time button 1712 is pressed, the cursor moves to a print time specification field 1713. The time for scheduled printing is set by setting numeric values input from the numeric keypad.

When the OK button 1715 is pressed, the input scheduled print job is set, and the screen returns to the screen in FIG. 16. If the Cancel key 1714 is pressed, the screen returns to the screen in FIG. 16 without the scheduled print job being set. Scheduled print jobs are executed based on details set in this way.

The processing of a scheduled print job is described next based on the flowchart of FIG. 18. This processing is timer interrupt processing performed every minute.

Firstly, it is judged at step S1801 whether or not a scheduled print job exists. If a scheduled print job does not exist, the processing is ended. If a scheduled print job does exist, processing proceeds to step S1802, where it is judged whether or not any of the scheduled print jobs match the current date and time. For example, if the job is specified by day, it is firstly judged whether or not the current day has been set as the scheduled print day, and if the current day has been set, it is further judged whether or not the current time matches the time specified by the print time specification. If the job is specified by interval, it is judged whether or not the elapsed number of days from the previous scheduled printing matches the set interval, after which the print time is judged. If the print time has not been reached, the processing is ended.

If it is judged that there exists a scheduled print job to be printed at the current date and time, the processing proceeds to step S1803, where the resource of the registered URL is acquired using HTTP, and the update information of the site is obtained. Regarding the acquisition of update information, since RSS 1.0 is given as an example in the present embodiment, a file with an "RSS" extension stored on (a storage apparatus of) the site shown by the URL is requested. Here, the request protocol is HTTP.

The processing then proceeds to step S1804, where the update information of the site received as a result of the request is analyzed.

The update information obtained at step S1803 is an XML file in a format such as shown in FIG. 15, for example. Analysis is made possible because the file itself describes the format in which the update information is written. For example, the description of the element 1401 reveals that the file in FIG. 15 is written in RSS 1.0 format. If the file is in RSS 1.0 format, the URL of updated information can be acquired from the description of the item elements 1404.

Also, the fourth line of the element 1409, for example, contains the following description:

<dc:date>2005-06-19T23:46:36+09:00</dc:date>

This description means that an update was performed at 23:46:36 hours on Jun. 19, 2005. Note that the "+9:00" at the end shows the time difference from Greenwich Mean Time.

Consequently, if this update time falls between the dates and times of the previous access and the current access, it can be determined that the homepage of the site has been updated, and, moreover, that it has not yet been printed.

Note that in FIG. 15, the tag "<dc:date> . . . </dc:date>" also exists in other lines. Consequently, if the update datetime information shown by at least one of these tabs falls between the dates and times of the previous access and the current access, it will be judged that the homepage of the respective site has been updated.

If it is judged as a result of analyzing the update information that the homepage of the respective site has been updated, the URL of the site is used to acquire the resource stored on the site by normal HTTP (step S1805). If the analysis reveals a plurality of updated homepages, acquisition processing is performed for each of these. Also, if a link to an image file or the like is included, that file is also acquired. At step S1806, the acquired information is rendered.

Note that the Web browser module 211 is used in the processing from HTTP communication to rendering, and that the blocks illustrated in FIG. 8 operate.

In step S1807, printing out is performed by sending rendered information to the printer portion 114 and operating the printer portion, after which the processing is ended. Note that the print settings used are those set on the print setting screen shown in FIG. 11.

The update information of the site is used to realize scheduled automatic printing of updated pages as a result of the above processing. Note that data obtained by rendering the update information itself may be included as an updated page. Also, although RSS 1.0 is used here as the exemplary format of the update information, the present invention is not limited to this, and other formats may be used such as Atom or other versions of RSS.

Second Embodiment

A second embodiment is described next. Because all updated pages are automatically printed out after analyzing the update information in the first embodiment, redundant pages are sometimes also printed out, wasting paper and toner. In view of this, in the second embodiment only the titles of updated URLs and a page composed of URLs showing the details of the update are printed out. The actual updated pages are stored in a storage apparatus of the image processing apparatus, and printed out in response to a request from the user. Also, since information changed at different times is stored even after the information on the actual site has been rewritten, information of the site that was changed at a desired time can be acquired if necessary.

Figure 19:
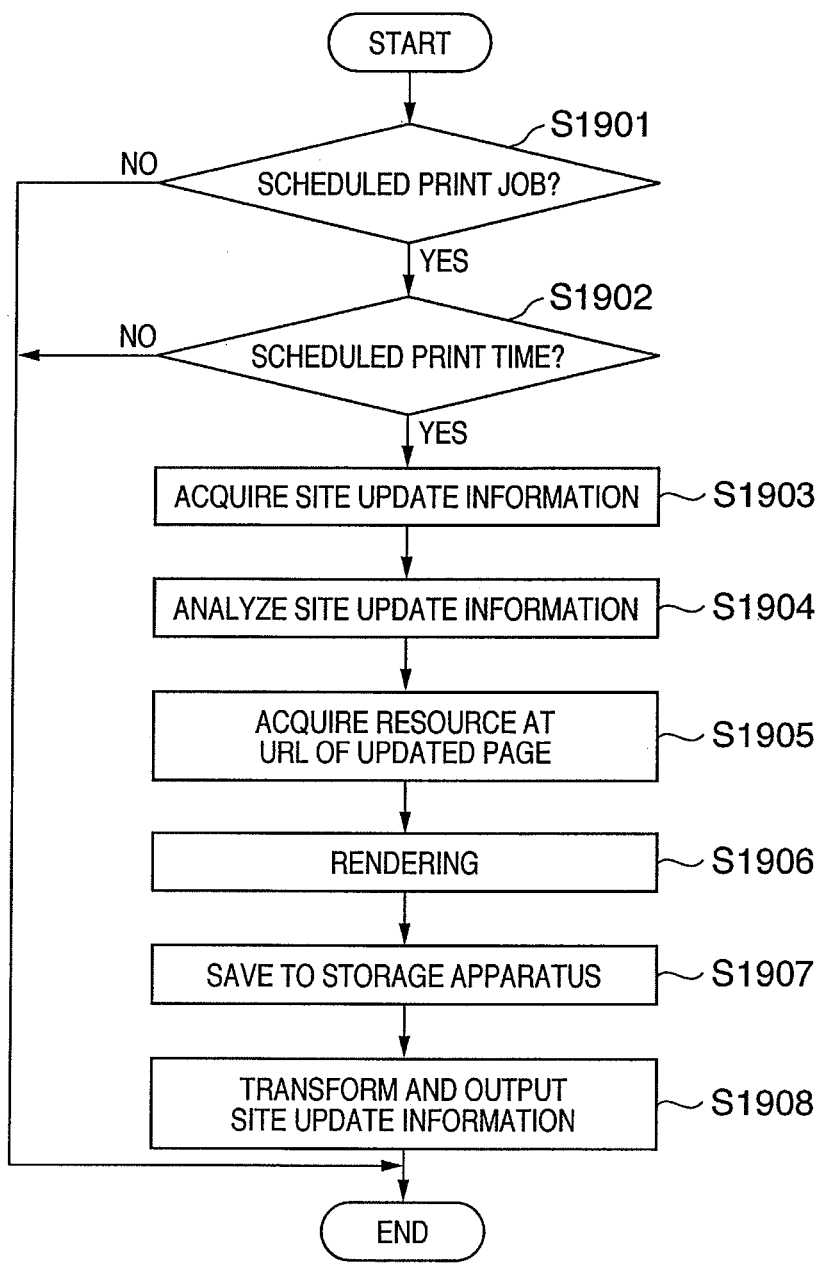
FIG. 19 is a flowchart showing the processing procedure of scheduled automatic printing in a second embodiment.

The configuration of the system, being the same as the first embodiment, is not described here. The processing of a scheduled print job, being different from the first embodiment, is described here based on FIG. 19.

Figure 18:
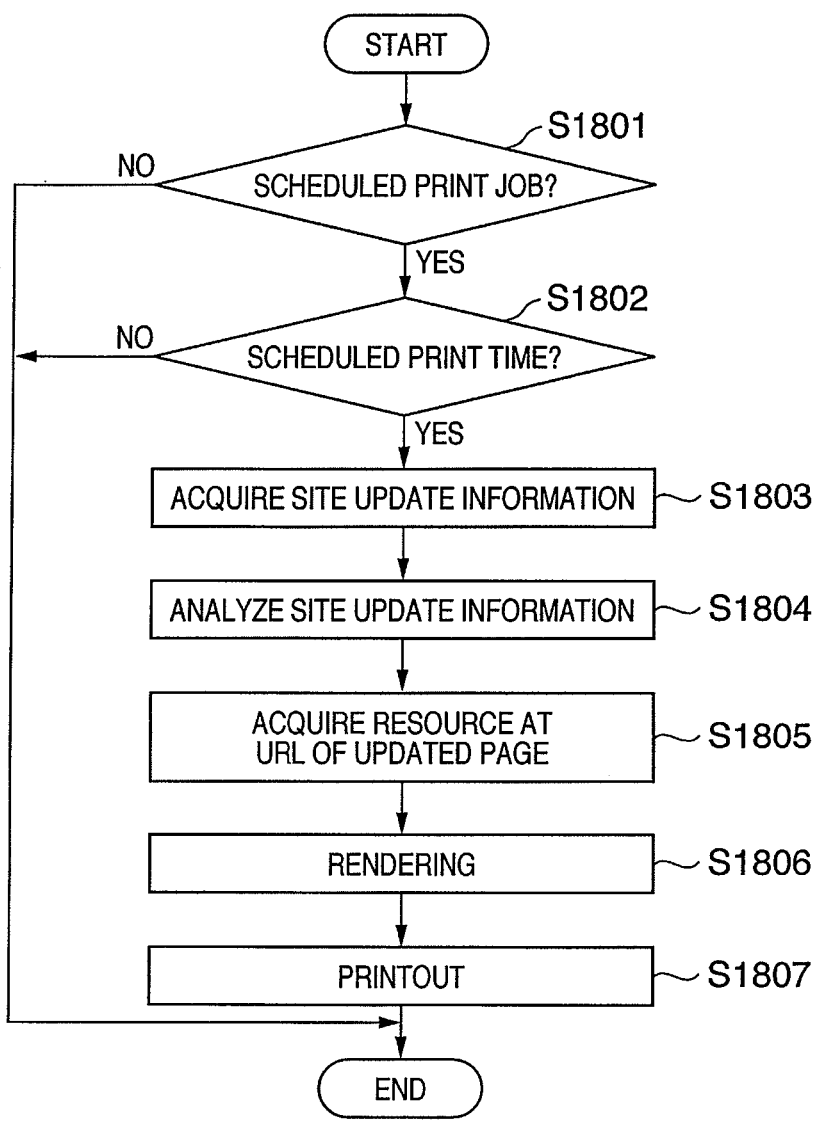
FIG. 18 is a flowchart showing the processing procedure of scheduled automatic printing.

Steps S1901 to S1906 are the same as steps S1801 to S1806 in FIG. 18.

At steps S1907, image data obtained by rendering an updated page is stored as a file on the HDD 304 in the image processing apparatus 110, without being printed out. At the same time, the character string of the title of the element 1417 (see FIG. 15) in the update information is extracted, a character string file is saved, and the character string file is corresponded with the image data file. The easiest way of doing this is probably to store them as an HTML file that contains the title character strings and the image filenames with paths of the image files.

At step S1908, a character string (article data etc.) is extracted from the update information analyzed at step S1904, the extracted character string is transformed so as to be more comprehensible to the user, and the transformed character string is output with the printer 1114, after which the processing is ended.

Figure 20:
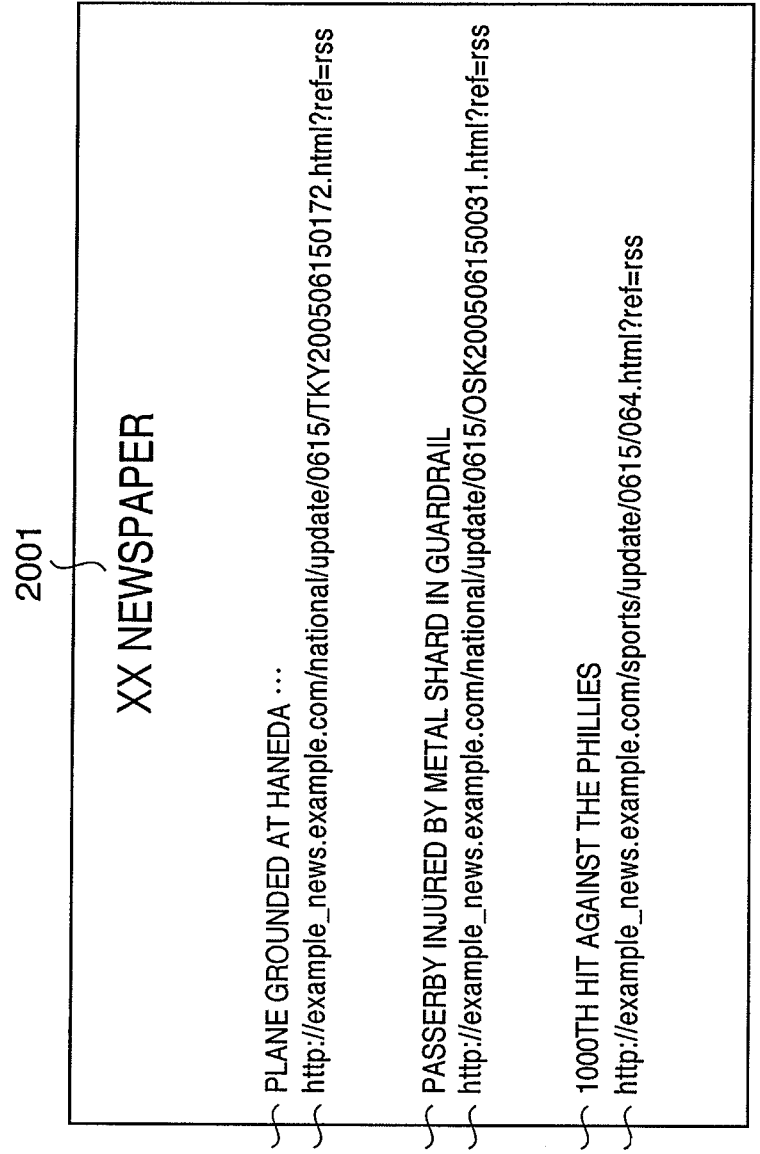
FIG. 20 shows an exemplary automatic printing result in the second embodiment.

FIG. 20 shows an example in which the update information shown in FIG. 14 has been transformed and output. 2001 is the title, with the content of the description element 1409 being applied. 2002 is the heading of the updated item, with the content of the title element 1417 of each item 1404 being applied. 2003 is the URL of the updated items, with the content of the link element 1418 of each item 1404 being applied.

Transforming and outputting the update information in this way enables the amount of recording paper consumed to be reduced at least in comparison to printing images on a homepage, and allows the user to easily check updated items.

Note that the method of transforming the update information is not limited to this, and various formats are conceivable. Enabling the user to select the transformation format is also possible.

Figure 21:
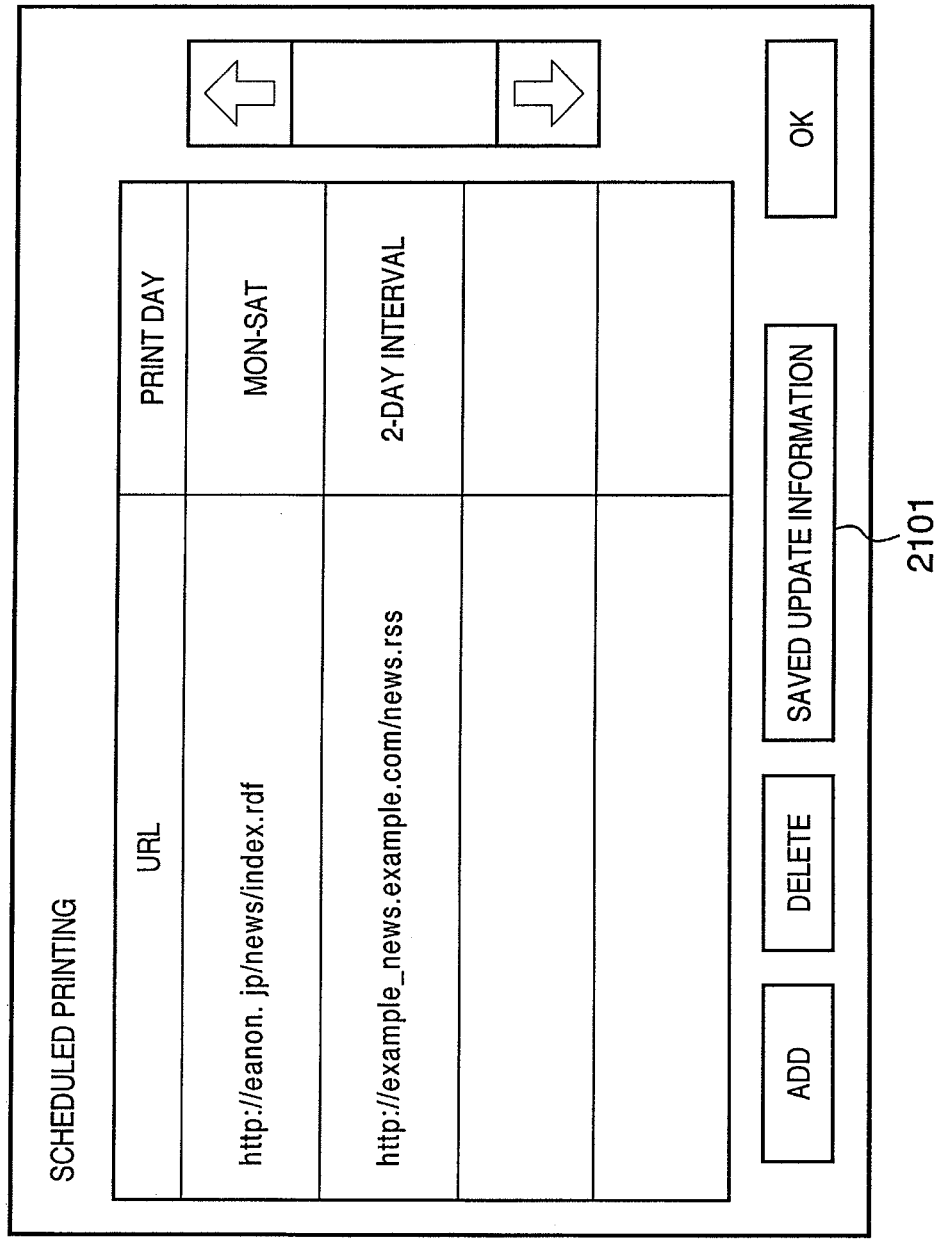
FIG. 21 shows an exemplary scheduled print setting screen in the second embodiment.
Figure 22:
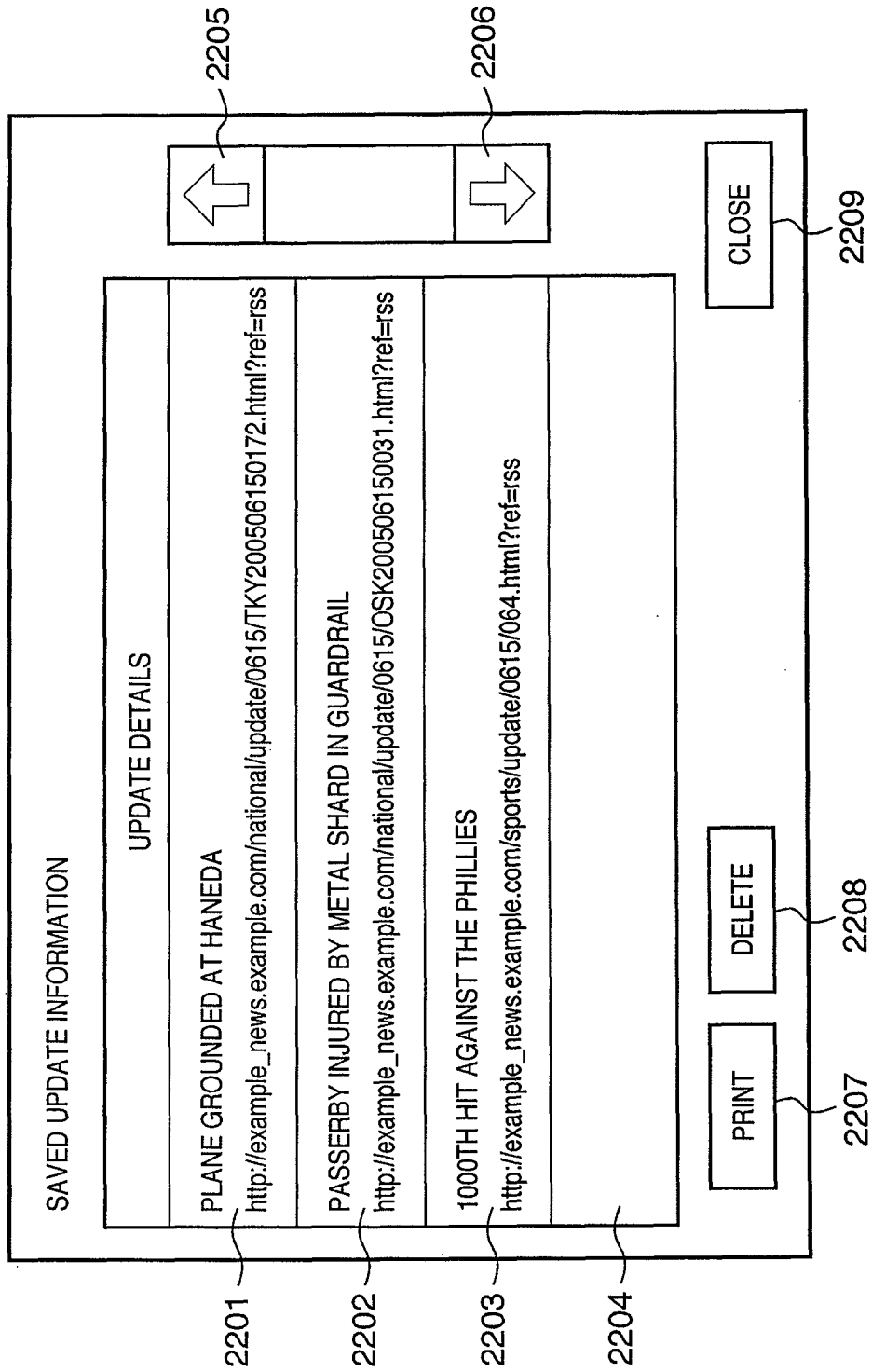
FIG. 22 shows an exemplary saved update information list screen displayed on an operation screen in the second embodiment.

Further, in the second embodiment, a "Saved Update Information" button as shown in FIG. 21 is additionally displayed on the screen in FIG. 16. When this button is pressed, the Saved Update Information screen shown in FIG. 22 is displayed. A list of updated pages stored on the HDD 304 at step 1907 is displayed from 2201 to 2204. With this list screen, the information of up to four updated pages can be displayed at one time, and if the list is longer than this, it can be scrolled using the arrow keys 2205 and 2206. Since the heading and URL of each updated item is displayed in the Saved Update Information field, the user can immediately see the correspondence with the output data shown in FIG. 20.

When one of the lines from 2201 to 2204 is pressed, that line is highlighted and placed in a selected state. When the Print button 2207 is pressed with at least one line selected, the selected update information is read from the HDD 304 and output to the printer. When the Delete button 2208 is pressed with one of the lines selected, the selected update information is deleted from the HDD 304.

Because pages of transformed site update information are automatically printed periodically by the above-described processing, the user is able to easily obtain information on updated pages. Further, because only required update pages are printed out after checking the update information, waste due to printing redundant pages can be removed.

According to the present embodiment described above, it is possible, in relation to a Web server that provides update information such as RSS, to reliably judge whether or not a resource released by the Web server has been updated. Consequently, information relating to the resource can be automatically printed only when the content has been updated, thereby eliminating waste of recording paper and other resources.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-349449, filed Dec. 2, 2005, which is hereby incorporated by reference herein in its entirety.

What is claimed is:

1. An image processing apparatus that communicates with a Web server, comprising:
    a registering unit constructed to register a URL of an update file written in RSS format or Atom format;
    an update file acquisition unit constructed to acquire, at a predetermined time, the update file identified by the URL registered by said registering unit;
    a determination unit constructed to determine, on the basis of the updated file acquired by said update file acquisition unit, whether or not the Web server has a Web resource generated later than a date when said update file acquisition unit had acquired the update file a previous time;
    a resource acquisition unit constructed to, in response that said determination unit determines that the Web Server has a Web resource generated later than a date when said update file acquisition unit had acquired the update file the previous time, acquire the Web resource from the Web Server;
    a storage unit constructed to associate and store i) a character sequence of the Web resource generated later than the date when said update file acquisition unit had acquired the update file the previous time and ii) the Web resource acquired by said resource acquisition unit;
    a first print control unit constructed to cause a print unit to print the character sequence;
    a displaying unit constructed to display the character sequence stored in said storage unit; and
    a second print control unit constructed to, when a user selects the character sequence displayed by said displaying unit, cause the print unit to print the Web resource stored in association with the character sequence selected by the user,
    wherein said determination unit determines whether or not the Web server has a Web resource generated later than the date when said update file acquisition unit had acquired the update file the previous time, before the resource acquisition unit acquires the Web resource.

2. The apparatus according to claim 1, further comprising a setting unit constructed to set the predetermined time for accessing the Web server based on an instruction from a user.

3. A control method for an image processing apparatus that communicates with a Web server, comprising:

a registering step of registering a URL of an update file written in RSS format or Atom format;

an update file acquisition step of acquiring, at a predetermined time, the update file identified by the URL registered by said registering unit;

a determining step of determining, on the basis of the updated file acquired in said update file acquisition step, whether or not the Web server has a Web resource generated later than a date when said update file acquisition step had acquired the update file a previous time;

a resource acquisition step of acquiring, in response that the determining step determines that the Web server has a Web resource generated later than a date when said update file acquisition step had acquired the update file the previous time, the Web resource from the Web server;

a storage step of associating and storing, in a storage unit, i) a character sequence of the Web resource generated later than the date when said update file acquisition step had acquired the update file the previous time and ii) the Web resource acquired in said resource acquisition step;

a first print control step of causing a print unit to print the character sequence;

a display step of displaying the character sequence stored in said storage unit; and a second print control step of, when a user selects the character sequence displayed in said display step, causing the print unit to print the Web resource stored in association with the character sequence selected by the user, wherein in the determination step, the determining is performed before the Web resource is acquired in the resource acquisition step.

4. The method according to claim 3, further comprising a setting step of setting the predetermined time for accessing the Web server based on an instruction from a user.

5. An image processing apparatus comprising:

a registering unit constructed to register a URL of an update file written in RSS format or Atom format;

an update file acquisition unit constructed to acquire, at a predetermined time, the update file identified by the URL registered by said registering unit;

a determination unit constructed to determine, on the basis of the update file acquired by said update file acquisition unit, whether or not a Web server has a Web resource generated later than a date when said update file acquisition unit had acquired the update file a previous time;

a resource acquisition unit constructed to acquire the Web resource from the Web server, in response to that said determination unit determines that the Web server has the Web resource generated later than a date when said update file acquisition unit had acquired the update file the previous time; and a print control unit constructed to cause a print unit to print the Web resource acquired by said resource acquisition unit.

6. The apparatus according to claim 5, further comprising a setting unit constructed to set the predetermined time for accessing the Web server based on an instruction from a user.

7. A method for controlling an image processing apparatus comprising:

a registering step of registering a URL of an update file written in RSS format or Atom format;

an update file acquisition step of acquiring, at a predetermined time, the update file identified by the URL registered in said registering step;

a determination step of determining, on the basis of the update file acquired in said update file acquisition step, whether or not a Web server has a Web resource generated later than a date when said update file acquisition step had acquired the update file a previous time;

a resource acquisition step of acquiring the Web resource from the Web server, in response that said determination step determines that the Web server has the Web resource generated later than the date when said update file acquisition step had acquired the update file the previous time; and a print control step of printing the Web resource acquired in said resource acquisition step.

8. The method according to claim 7, further comprising a setting step of setting the predetermined time for accessing the Web server based on an instruction from a user.

* * * * *